US011655403B2

(12) United States Patent
Volp et al.

(10) Patent No.: US 11,655,403 B2
(45) Date of Patent: May 23, 2023

(54) PRINTABLE CURABLE MIXTURES AND CURED COMPOSITIONS

(71) Applicant: 3M INNOVATIVE PROPERTIES COMPANY, St. Paul, MN (US)

(72) Inventors: Kelly A. Volp, Minneapolis, MN (US); Kathleen S. Shafer, Woodbury, MN (US); Ross E. Behling, Woodbury, MN (US); Ann M. Gilman, Woodbury, MN (US); Mark F. Ellis, St. Paul, MN (US); Matthew R. D. Smith, Woodbury, MN (US); Aaron T. Hedegaard, Woodbury, MN (US); Xiaoming Jiang, Shanghai (CN); Cyrus A. Anderson, Bellingham, WA (US)

(73) Assignee: 3M Innovative Properties Company, St. Paul, MN (US)

( * ) Notice: Subject to any disclaimer, the term of this patent is extended or adjusted under 35 U.S.C. 154(b) by 513 days.

(21) Appl. No.: 16/621,276

(22) PCT Filed: Jun. 27, 2018

(86) PCT No.: PCT/IB2018/054756
§ 371 (c)(1),
(2) Date: Dec. 11, 2019

(87) PCT Pub. No.: WO2019/003138
PCT Pub. Date: Jan. 3, 2019

(65) Prior Publication Data
US 2020/0115597 A1    Apr. 16, 2020

Related U.S. Application Data

(60) Provisional application No. 62/527,227, filed on Jun. 30, 2017.

(51) Int. Cl.
C09J 133/14    (2006.01)
C08L 33/14    (2006.01)
C09J 7/38    (2018.01)

(52) U.S. Cl.
CPC .......... *C09J 133/14* (2013.01); *C08L 33/14* (2013.01); *C09J 7/38* (2018.01); *C09J 7/385* (2018.01); *B32B 2405/00* (2013.01); *C09J 2433/00* (2013.01)

(58) Field of Classification Search
CPC ....... B32B 2405/00; C08K 5/04; C08L 33/14; C08L 63/00; C09J 7/30; C09J 7/38; C09J 7/385; C09J 7/40; C09J 133/14; C09J 2301/312; C09J 2433/00
See application file for complete search history.

(56) References Cited

U.S. PATENT DOCUMENTS

| | | | |
|---|---|---|---|
| 4,642,126 A | 2/1987 | Zador | |
| 4,652,274 A | 3/1987 | Boettcher | |
| 4,717,605 A | 1/1988 | Urban | |
| 4,737,593 A | 4/1988 | Ellrich | |
| 5,637,646 A | 6/1997 | Ellis | |
| 5,721,289 A | 2/1998 | Karim | |
| 5,804,610 A | 9/1998 | Hamer | |
| 5,986,011 A | 11/1999 | Ellis | |
| 6,136,384 A | 10/2000 | Karim | |
| 6,187,836 B1 | 2/2001 | Oxman | |
| 8,506,752 B2 | 8/2013 | Vandal | |
| 2002/0182955 A1 | 12/2002 | Weglewski | |
| 2006/0162857 A1* | 7/2006 | Nagamoto | G02B 5/305 156/272.8 |
| 2007/0092733 A1* | 4/2007 | Yang | C09J 133/14 525/523 |
| 2008/0023131 A1 | 1/2008 | Pressley | |
| 2012/0059127 A1 | 3/2012 | Ha | |
| 2015/0252227 A1 | 9/2015 | Zajaczkowski | |
| 2015/0309353 A1 | 10/2015 | Stensvad | |
| 2017/0121562 A1 | 5/2017 | Wang | |

FOREIGN PATENT DOCUMENTS

| | | | |
|---|---|---|---|
| DE | 3516661 | 11/1985 | |
| EP | 1026218 | 8/2000 | |
| JP | 09279103 A * | 10/1997 | |
| JP | 2006008824 A * | 1/2006 | |
| WO | 2011-119363 | 9/2011 | |
| WO | WO-2014078115 A1 * | 5/2014 | B05D 3/06 |
| WO | 2014-088936 | 6/2014 | |
| WO | 2014-088939 | 6/2014 | |

(Continued)

OTHER PUBLICATIONS

Decker, "Kinetic Study and New Applications of UV Radiation Curing", Macromolecular Rapid Communications, 2002, vol. 23, No. 18, pp. 1067-1093.

(Continued)

*Primary Examiner* — Eli D. Strah
(74) *Attorney, Agent, or Firm* — Jean A. Lown

(57) ABSTRACT

A curable mixture, a partially cured composition, a cured composition, an article containing either the partially cured composition or the cured composition, and a method of bonding two substrates are provided. The partially cured composition functions as a pressure-sensitive adhesive while the cured composition functions as a structural or semi-structural adhesive. The curable mixture can be applied to a first substrate by printing or dispensing, if desired.

11 Claims, No Drawings

(56) References Cited

FOREIGN PATENT DOCUMENTS

| WO | 2016-195970 | 12/2016 | |
|---|---|---|---|
| WO | 2016-196561 | 12/2016 | |
| WO | WO-2016195970 A1 * | 12/2016 | ............... C08F 2/48 |
| WO | 2017-117163 | 7/2017 | |

OTHER PUBLICATIONS

Encyclopedia of Polymer Science and Technology, 322, (1986).
Hiemenz and Lodge, Polymer Chemistry, Second Edition, 2007, pp. 491-495.
Vidil, "Supramolecular Control of Propagation in Cationic Polymerization of Room Temperature Curable Epoxy Compositions", Macromolecules, Nov. 2013, vol. 46, No. 23, pp. 9240-9248.
International Search Report for PCT International Application No. PCT/IB2018/054756, dated Oct. 30, 2018, 5 pages.
Jing et al., "UV glazing process and technology 200 questions", Printing Industry Press (Jan. 2012), 3 pp.
Yuzhong et al., "Rubber plastic processing and molding and product application engineering manual material matching and mixing process plastic part", Chemical Industry Press (Oct. 2011), 6 pp.

\* cited by examiner

PRINTABLE CURABLE MIXTURES AND CURED COMPOSITIONS

CROSS REFERENCE TO RELATED APPLICATION

This application is a national stage filing under 35 U.S.C. 371 of PCT/IB2018/054756, filed Jun. 27, 2018, claims the benefit of U.S. Provisional Patent Application No. 62/527227, filed Jun. 30, 2017, the disclosures of which are incorporated by reference herein in their entirety.

TECHNICAL FIELD

Curable mixtures that can be printed or dispensed are provided. The curable mixtures include a first curable composition and a second curable composition that can be sequentially cured. Cured compositions formed from the curable mixtures are also provided.

BACKGROUND

Structural adhesives are useful for bonding one or more substrates to one another. Many structural adhesives fall into one of two groups: (1) heat-curable structural adhesives and (2) ultraviolet (UV) light-curable structural adhesives. As suggested by the class name, heat-curable structural adhesives require heat for curing while UV light-curable structural adhesives begin to cure when exposed to UV light. Although heat usually is not required for curing UV light-curable structural adhesives, heat can be used to accelerate the rate of curing.

The curable structural adhesive can be in the form of a structural bonding tape. In many embodiments, the structural bonding tape has a layer of the curable structural adhesive composition adjacent to a release liner. A length of the structural bonding tape or a die cut piece of the structural bonding tape is removed from a roll and attached to a first substrate using finger pressure. After removal of the release liner, the curable structural adhesive is attached to a second substrate. In the case of UV light-curable structural adhesives, the curable structural adhesive is often exposed to UV radiation and then the second substrate is brought into contact with the irradiated curable adhesive. Pressure is applied to the assembly and, ultimately, a cured adhesive is formed between the two substrates. In the case of heat-curable structural adhesives (and optionally for UV light curable structural adhesives), the curable structural adhesive is positioned between the first substrate and the second substrate. The entire assembly is then exposed to heat for curing and then allowed to cool. The result is an article having a first substrate bonded to the second substrate with a cured structural adhesive.

UV-curable structural bonding tapes offer an advantage of not requiring heat for curing. This is particularly important if the first or second substrate is susceptible to damage and/or degradation upon exposure to heat. Many conventional UV-curable structural bonding tapes, however, possess high cold flow properties. Cold flow is a measure of the creep behavior of a curable structural adhesive composition at room temperature (e.g., 25° C.). Many conventional UV-curable structural bonding tapes tend to have significant flow of the curable structural adhesive under typical roll winding tension conditions and under typical storage conditions such as temperature and weight. Thus, these structural bonding tapes may require cold storage and/or support scrims (e.g., fiber reinforcement) and/or special packaging to maintain dimensionally stable rolls and/or stable die cut parts.

SUMMARY

A curable mixture, a partially cured composition, a cured composition, an article containing either the partially cured composition or the cured composition, and a method of bonding two substrates are provided. The partially cured composition functions as a pressure-sensitive adhesive while the cured composition functions as a structural or semi-structural adhesive. The curable mixture can be applied to a first substrate by printing or dispensing, if desired.

In a first aspect, a curable mixture is provided. The curable mixture contains (a) a first curable composition and (b) a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength.

In a second aspect, a partially cured composition is provided. The partially cured composition contains (a) a first cured composition that is a reaction product of a first curable composition and (b) a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength.

In a third aspect, a cured composition is provided. The cured composition contains (a) a first cured composition that is a reaction product of a first curable composition and (b) a second cured composition that is a reaction product of a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength.

In a fourth aspect, an article is provided. The article includes a first substrate or a first release liner and a partially cured composition positioned adjacent to the first substrate or to the first release liner. The partially cured composition contains (a) a first cured composition that is a reaction product of a first curable composition and (b) a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength.

In a fifth aspect, another article is provided. This article includes a first substrate, a second substrate, and a cured composition positioned between the first substrate and the second substrate. The first substrate is bonded to the second substrate with the cured composition. The cured composition contains (a) a first cured composition that is a reaction product of a first curable composition and (b) a second cured composition that is a reaction product of a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength.

In a sixth aspect, a method of bonding is provided. The method includes providing a curable mixture containing a first curable composition and a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength. The method further includes applying the curable mixture to a first substrate or to a first release liner and exposing the curable mixture to the first wavelength of actinic radiation to form a partially cured composition adjacent to the first substrate or adjacent to the first release liner, wherein the partially cured composition contains (a) a first cured composition that is a reaction product of a first curable composition and (b) the curable second mixture. If the curable composition is applied to the first release liner, the method further includes transferring the partially cured composition from the first release liner to the first substrate. The method still further includes exposing the partially cured composition to the second wavelength of actinic radiation to form an irradiated composition and positioning a second substrate adjacent to the irradiated composition. The method yet further includes forming a cured composition that bonds the first substrate to the second substrate.

DETAILED DESCRIPTION

A curable mixture is provided that includes two curable compositions that are mixed together. The two curable compositions are separately cured by sequential exposure to different wavelengths of actinic radiation. More specifically, the curable mixture includes a first curable composition that is cured to form a first cured composition upon exposure to a first wavelength of actinic radiation. The curable mixture further includes a second curable composition that is cured upon exposure to a second wavelength of actinic radiation that is different than the first wavelength of actinic radiation. The second curable composition is not cured when exposed to the first wavelength of actinic radiation.

By exposing the curable mixture to the first wavelength of actinic radiation, the first curable composition is cured and a partially cured composition is formed. The partially cured composition includes the first cured composition and the second curable composition. By further exposing the partially cured composition to the second wavelength of actinic radiation, the second curable composition is cured. The resulting cured composition contains the first cured composition and the second cured composition.

The curable mixture can typically be printed or dispensed onto a substrate. In many embodiments, the curable mixture can be printed or dispensed into a pattern on the substrate. The pattern can have any size, shape, and design. To be printed or dispensed, the curable mixture typically has a low shear viscosity. The shear viscosity is considerably lower than that used in conventional processes such as hot melt extrusion processes used to form many conventional structural adhesive bonding tapes. Printing or dispensing the curable mixture onto a substrate can be desirable in some applications because die-cutting a partially cured composition to get the desired shape can be avoided.

The curable mixture usually has a shear viscosity no greater than 150 Pascal-seconds (Pa-s) at a shear rate of 100 sec$^{-1}$ when measured using a parallel plate viscometer. The shear viscosity is often no greater than 140 Pa-s, no greater than 130 Pa-s, no greater than 120 Pa-s, no greater than 110 Pa-s, no greater than 105 Pa-s, no greater than 100 Pa-s, no greater than 95 Pa-s, or no greater than 90 Pa-s at a shear rate of 100 sec$^{-1}$. The shear viscosity is often at least 1 Pa-s, at least 2 Pa-s, at least 5 Pa-s, at least 10 Pa-s, or at least 20 Pa-s at a shear rate of 100 sec$^{-1}$. Further details regarding the shear viscosity measurements are included in the Examples section.

The curable mixture usually has a shear viscosity no greater than 1000 Pascals-seconds (Pa-s) at a shear rate of 0.1 sec$^{-1}$. The shear viscosity is often no greater than 800 Pa-s, no greater than 600 Pa-s, no greater than 500 Pa-s, no greater than 400 Pa-s, no greater than 300 Pa-s, or no greater than 200 Pa-s at a shear rate of 0.1 sec$^{-1}$. The shear viscosity is often at least 5 Pa-s, at least 10 Pa-s, at least 20 Pa-s, at least 50 Pa-s, or at least 100 Pa-s at a shear rate of 0.1 sec$^{-1}$. Further details regarding the shear viscosity measurements are included in the Examples section.

Printing or dispensing the curable mixture onto a substrate can be desirable in some applications because die-cutting of the partially cured composition to get the desired shape is not needed. Die cutting can often alter the shape or the dimensions of the partially cured composition and/or can add waste to the manufacturing process. In many embodiments, the partially cured composition has good dimensional stability as determined by measuring the percent creep recovery as described in the Examples.

The curable mixture contains both a first curable composition and a second curable composition. The first curable composition contains (1) a (meth)acrylate copolymer having at least two pendant (meth)acryloyl groups, the (meth) acrylate copolymer having a weight average molecular weight in a range of 35,000 to 300,000 Daltons (grams/mole) and (2) a free radical photoinitiator that is sensitive to radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength. The components can be selected and/or other components can be added to provide a curable mixture that can be printed or dispensed.

As used herein, the term "and/or" such as in the expression A and/or B means A alone, B alone, or both A and B.

As used herein regarding the free radial photoinitiator, being "sensitive" to a first wavelength of actinic radiation means that free radical photoinitiator can form a free radical or be "activated" upon exposure to the first wavelength of actinic radiation.

As used herein regarding the photo-acid generator, being "sensitive" to a second wavelength of actinic radiation but not of a first wavelength of actinic radiation means that the photo-acid generator can generate an acid or be "activated" upon exposure to the second wavelength of actinic radiation but not upon exposure to the first wavelength of actinic radiation.

As used herein, the term "organic solvent" refers to an unreactive organic compound that may be present in a composition to lower the viscosity of the composition. Organic solvents do not include monomers or other reactive components of the curable mixture, the first curable composition, or the second curable composition.

The first curable composition is cured before the second curable composition. Curing of the first curable composition but not the second curable composition results in the formation of a partially cured composition that contains the first cured composition plus the second curable composition. This partially cured composition typically is a pressure-sensitive adhesive.

The Pressure-Sensitive Tape Council defines pressure-sensitive adhesives (PSAs) as materials that possess the following properties: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). Materials that are merely sticky or adhere to a surface do not constitute a PSA; the term PSA encompasses materials with additional viscoelastic properties. PSAs are adhesives that satisfy the Dahlquist criteria for tackiness at room temperature and typically exhibit adhesion, cohesion, compliance, and elasticity at room temperature.

Being a pressure-sensitive adhesive, the partially cured composition can adhere to a first substrate. The partially cured composition is then exposed to a second wavelength of actinic radiation to activate curing of the second curable composition. The second substrate is then positioned adjacent to the irradiated (i.e., activated) partially cured composition. Curing proceeds resulting in the formation of a cured composition between the first substrate and the second substrate. The cured composition bonds the first substrate to the second substrate.

The cured composition formed after sequential exposure to a first wavelength of actinic radiation and a second wavelength of actinic radiation is typically either a structural adhesive or a semi-structural adhesive. As used herein, the term "semi-structural adhesive" refers to those cured compositions that have an overlap shear strength of at least 0.60 megaPascals (MPa) or at least 0.75 MPa. More preferably, the overlap shear strength is at least 1.0 MPa or at least 1.5 MPa. Those cured compositions having a particularly high overlap shear strength, however, are referred to herein as "structural adhesives". Structural adhesives are those cured compositions that have an overlap shear strength of at least 3.5 MPa, at least 4.0 MPa, at least 4.5 MPa, or at least 5 MPa.

Curable Composition

First Curable Composition

The first curable composition contains (1) a (meth)acrylate copolymer having at least two pendant (meth)acryloyl groups and having a weight average molecular weight in a range of 35,000 to 300,000 Daltons and (2) a free radical photoinitiator that is sensitive to actinic radiation of a first wavelength. The actinic radiation of the first wavelength is often in the visible or near ultraviolet region of the electromagnetic spectrum such as, for example, in a range of 380 nanometers to 800 nanometers. The actinic radiation is selected so that the free radical photoinitiator in the first curable composition is activated but that the photo-acid generator in the second curable composition is not activated by exposure to the first wavelength.

(Meth)Acrylate Copolymer Having at Least Two Pendant (Meth)Acryloyl Groups

As used herein, the term "(meth)acryloyl" group refers to a group of formula $CH_2=CHR^1-(CO)-$ where $R^1$ is hydrogen or methyl. The (meth)acryloyl group is a methacryloyl group when $R^1$ is methyl and an acryloyl group when $R^1$ is hydrogen. The (meth)acryloyl group is usually a (meth)acryloyloxy group of formula $CH_2=CHR^1-(CO)-O-$ or (meth)acryloylamido group of formula $CH_2=CHR^1-(CO)-NH-$.

The term "(meth)acrylate copolymer" refers to a polymeric material that is formed from multiple different monomers having (meth)acryloyl groups. Greater than 50 weight percent of the monomeric units in the (meth)acrylate copolymer are derived from monomers having (meth)acryloyl groups. In some embodiments, at least 60 weight percent, at least 70 weight percent, at least 80 weight percent, at least 90 weight percent, at least 95 weight percent, at least 98 weight percent, at least 99 weight percent, or even 100 weight percent of the monomeric units in the (meth)acrylate copolymer are derived from monomers having (meth)acryloyl groups.

The (meth)acrylate copolymer having at least two pendant (meth)acryloyl groups is typically formed from another (meth)acrylate copolymer that is referred to herein as the "precursor (meth)acrylate copolymer". The precursor (meth)acrylate copolymer typically has pendant groups such as hydroxyl groups (—OH), carboxylic acid groups (—(CO)OH), or anhydride groups (—(CO)—O—(CO—)) that can react with an unsaturated reagent compound to produce the (meth)acrylate copolymer with pendant (meth)acryloyl groups. In many embodiments, the pendant groups in the precursor (meth)acrylate copolymer are hydroxyl groups and/or carboxylic acid groups.

As used herein, the term "unsaturated reagent compound" refers to a compound having a (meth)acryloyl group plus a complementary group that is capable of reacting with the pendant hydroxyl groups, pendant carboxylic acid groups, or pendant anhydride groups on the precursor (meth)acrylate copolymer to prepare the (meth)acrylate copolymer having pendant (meth)acryloyl groups.

The phrases "(meth)acrylate copolymer having at least two pendant (meth)acryloyl groups" and "(meth)acrylate copolymer having pendant (meth)acryloyl groups" are used interchangeably.

The pendant (meth)acryloyl group is indirectly linked to the backbone of the (meth)acrylate copolymer through a linking group. The pendant group is typically of formula $CH_2=CHR^1-(CO)-Q-L-$ where L is the linking group, where Q is —O— or —NH—, and where $R^1$ is hydrogen or alkyl (e.g., methyl). The group L includes at least one alkylene, arylene, or combination thereof and can optionally further include —O—, —O(CO)—, —NH(CO)—, —NH—, or a combination thereof. Suitable alkylene groups (i.e., an alkylene is a divalent radical of an alkane) often have 1 to 10 carbon atoms, 1 to 6 carbon atoms, or 1 to 4 carbon atoms. Suitable arylene groups (i.e., an arylene is a divalent radical of a carbocyclic aromatic compound) often have 6 to 12 carbon atoms, 6 to 10 carbon atoms, or 6 carbon atoms. The arylene is often phenylene.

The precursor (meth)acrylate copolymer is typically formed from a polymerizable composition that contains a monomer composition that includes (1) a first monomer that is a (hetero)alkyl (meth)acrylate (i.e., a (hetero)alkyl refers to a heteroalkyl, alkyl, or both) and (2) a second monomer having an ethylenically unsaturated group and a functional group that reacts with the unsaturated reagent compound to provide pendant (meth)acryloyl groups. The overall monomer composition is selected so that the (meth)acrylate copolymer having pendant (meth)acryloyl groups is miscible with the second curable composition. The (hetero)alkyl (meth)acrylate first monomers are selected to provide the desired modulus and glass transition temperature of the (meth)acrylate copolymer having pendant (meth)acryloyl groups.

Exemplary alkyl (meth)acrylate first monomers include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, 2-methylbutyl (meth)acrylate, n-hexyl (meth)acrylate, cyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, isononyl (meth)acrylate, isoamyl (meth)acrylate, isobornyl (meth)acrylate, n-decyl (meth)acrylate, isodecyl (meth)acrylate, 2-propylheptyl (meth)acrylate, isotridecyl (meth)acrylate, isostearyl (meth)acrylate, octadecyl (meth)acrylate, 2-octyldecyl (meth)acrylate, dodecyl (meth)acrylate, lauryl (meth)acrylate, and heptadecanyl (meth)acrylates. Some exemplary branched alkyl (meth)acrylates are (meth)acrylic acid esters of Guerbet alcohols having 12 to 32 carbon atoms as described in PCT Patent Application Publication WO 2011/119363 (Clapper et al.).

Suitable heteroalkyl (meth)acrylate first monomers include, but are not limited, those having one or more ether linkages, which refers to an oxy group between two alkylene groups. That is, the heteroalkyl contains one or more oxygen heteroatoms. One example is tetrahydrofuran (meth)acrylate. Other examples include alkoxylated alkyl (meth)acrylates such as ethoxyethoxyethyl (meth)acrylate, 2-methoxyethyl (meth)acrylate, and 2-ethoxyethyl (meth)acrylate; and poly(alkylene oxide) (meth)acrylates such as poly(ethylene oxide) (meth)acrylates and poly(propylene oxide) (meth) acrylates. The poly(alkylene oxide) acrylates are often referred to as poly(alkylene glycol) (meth)acrylates. These monomers can have any suitable end group such as a hydroxyl group or an alkoxy group. For example, when the end group is a methoxy group, the monomer can be referred to as methoxy poly(ethylene glycol) (meth)acrylate. If the end group is a hydroxyl group, the monomer is classified as a second monomer having a functional hydroxyl group.

In many embodiments, the monomer composition used to form the precursor (meth)acrylate copolymer contains at least 50 weight percent, at least 55 weight percent, at least 60 weight percent, at least 65 weight percent, at least 70 weight percent, at least 75 weight percent, or at least 80 weight percent of the (hetero)alkyl (meth)acrylate. The monomer composition can contain up to 99.9 weight percent, up to 99.5 weight percent, up to 99 weight percent, up to 98 weight percent, up to 95 weight percent, up to 90 weight percent, up to 85 weight percent, up to 80 weight percent, up to 75 weight percent, up to 70 weight percent, up to 65 weight percent, or up to 60 weight percent of the (hetero)alkyl (meth)acrylate. The weight percent values are based on a total weight of monomers in the monomer composition used to form the precursor (meth)acrylate copolymer.

The second monomer included in the monomer composition used to form the precursor (meth)acrylate copolymer has an ethylenically unsaturated group and a functional group that reacts with the unsaturated reagent compound to provide pendant (meth)acryloyl groups. The functional group is typically hydroxyl (—OH) and/or carboxylic acid (—(CO)OH) and/or an anhydride group (—(CO)—O—(CO)—). A combination of second monomers can be used.

Useful second monomers having a carboxylic acid group include (meth)acrylic acid, itaconic acid, fumaric acid, crotonic acid, citraconic acid, maleic acid, oleic acid, and ß-carboxyethyl acrylate.

Useful monomers having a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth) acrylate); hydroxyalkyl (meth)acrylamides (e.g., 2-hydroxyethyl (meth)acrylamide and 3-hydroxypropyl (meth)acrylamide); and aryloxy substituted hydroxyalkyl (meth) acrylates (e.g., 2-hydroxy-2-phenoxypropyl (meth)acrylate). Additionally, hydroxyl functional monomers based on glycols derived from ethylene oxide or propylene oxide can also be used. These monomers typically have a hydroxyl equivalent weight of less than 400. The hydroxyl equivalent molecular weight is defined as the molecular weight of the monomeric compound divided by the number of hydroxyl groups in the monomer. Ethoxylated hydroxyethyl (meth) acrylate monomers are commercially available from Sartomer (Exton, Pa., USA) under the trade designation CD570, CD571, and CD572. An example hydroxyl terminated polypropylene glycol acrylate is commercially available under the trade name BISOMER PPA 6 from Cognis, Germany.

Useful second monomers having an anhydride group include maleic anhydride and methacrylic acid anhydride.

The monomer composition used to form the precursor (meth)acrylate copolymer often contains at least 0.1 weight percent, at least 0.2 weight percent, at least 0.3 weight percent, at least 0.5 weight percent, at least 1 weight percent, at least 2 weight percent, at least 3 weight percent, at least 5 weight percent, at least 10 weight percent and up to 30 weight percent, up to 25 weight percent, up to 20 weight percent, up to 15 weight percent, up to 10 weight percent, or up to 5 weight percent of the second monomer. The amount of the second monomer is based on a total weight of monomers in the monomer composition used to form the precursor (meth)acrylate copolymer.

Various optional (meth)acrylate monomers can be included in the monomer mixture. Some optional (meth) acrylate monomers have an aromatic group. Examples include benzyl (meth)acrylate, 2-phenoxyethyl acrylate, 2-(phenylthio)ethyl acrylate, 2-phenylphenoxyethyl acrylate, 2-biphenylhexyl (meth)acrylate, and 2-(biphenyl)ethyl acrylate.

Other optional monomers have a vinyl group that is not a (meth)acryloyl group. Examples include vinyl ethers, vinyl esters (e.g., vinyl acetate), olefinic monomers (e.g., ethylene, propylene, or butylene), styrene, styrene derivatives (e.g., alpha-methyl styrene), and the like.

Any of these optional monomers can be present in desired amount but typically the monomer composition contains 0 to 20 weight percent of the optional monomers. In some embodiments, the monomer composition contains less than 15 weight percent, less than 10 weight percent, or less than 5 weight percent of the optional monomers but can contain at least 1 weight percent, at least 2 weight percent, at three weight percent, or at least 5 weight percent of the optional monomers. The weight percent values are based on a total weight of monomers in the monomer composition.

The precursor (meth)acrylate copolymer typically is not crosslinked. Thus, the monomer composition used to form the precursor (meth)acrylate copolymer typically is free or substantially free of a crosslinking monomer such as, for example, a crosslinking monomer having a plurality of (meth)acryloyl groups. As used herein, the term "substantially free" regarding the crosslinking monomer means that the monomer composition typically contains less than 0.5 weight percent, less than 0.4 weight percent, less than 0.3 weight percent, less than 0.2 weight percent, less than 0.1 weight percent, less than 0.05 weight percent, less than 0.02 weight percent, or less than 0.01 weight percent crosslinking monomer. The weight percent values are based on the total weight of monomers in the monomer composition.

In many embodiments, the monomer composition used to prepare the precursor (meth)acrylate copolymer contains 50 to 99.9 weight percent (hetero)alkyl (meth)acrylate monomers, 0.1 to 30 weight percent second monomers having an ethylenically unsaturated group and a functional group that reacts with the unsaturated reagent compound to provide pendant (meth)acryloyl groups, and 0 to 20 weight percent optional monomers. In many embodiments, the monomer mixture contains 70 to 99.9 weight percent (hetero)alkyl (meth)acrylate monomers and 0.1 to 30 weight percent second monomers, 70 to 99 weight percent (hetero)alkyl (meth)acrylate monomers and 1 to 30 weight percent second monomers, 75 to 99 weight percent (hetero)alkyl (meth) acrylate monomers and 1 to 25 weight percent second monomers, 75 to 98 weight percent (hetero)alkyl (meth) acrylate monomers and 2 to 25 weight percent second monomers, 80 to 99 weight percent (hetero)alkyl (meth) acrylate monomers and 1 to 20 weight percent second monomers, or 80 to 98 weight percent (hetero)alkyl (meth) acrylate monomers and 2 to 20 weight percent second monomers. The weight percent values are based on the total weight of monomers in the monomer composition.

Chain-transfer agents are often included in the polymerizable composition to control the molecular weight of the precursor (meth)acrylate copolymer. Suitable chain-transfer agents include, but are not limited to, those selected from the group of carbon tetrabromide, hexabromoethane, brormotrichlroomnethane, 2-mercaptoethanol, tert-dodecylmercaptan, isooctylthioglycoate, 3-mercapto-1,2-propanediol cumene, pentaerythritol tetrakis(3-mercapto butyrate) (available under the trade name KARENZ MT PEI from Showa Denko), ethylene glycol bisthioglycolate, and mixtures thereof. Depending on the reactivity of the chain-transfer agent selected, the amount of chain transfer agent is often in a range of 0 to 5 weight percent based on the total weight of monomers in the polymerizable composition. In some embodiments, the amount of the chain transfer agent is at least 0.05 weight percent, at least 0.1 weight percent, at least 0.2 weight percent, at least 0.3 weight percent, or at least 0.5 weight percent and can be up to 4.5 weight percent, up to 4 weight percent, up to 3.5 weight percent, up to 3 weight percent, up to 2.5 weight percent, up to 2 weight percent, up to 1.5 weight percent, or up to 1 weight percent.

A free radical initiator is typically used to form the precursor (meth)acrylate copolymer. The free radical initiator can be a photoinitiator or a thermal initiator. Multiple photoinitiators or multiple thermal initiators can be used. The amount of the free radical initiator can influence the weight average molecular weight with larger amounts typically producing lower molecular weight polymeric materials. The amount of the free radical initiator in the polymerizable composition used to form the precursor (meth) acrylate copolymer is often at least 0.05 weight percent based on the total weight of monomers in the monomer composition. In some embodiments, the amount of free radical initiator is usually at least 0.001 weight percent, at least 0.005 weight percent, at least 0.01 weight percent, at least 0.05 weight percent, or at least 0.1 weight percent based on the total weight of monomers. The amount can be up to 5 weight percent, up to 4 weight percent, up to 3 weight percent, up to 2 weight percent, up to 1.5 weight percent, up to 1 weight percent, up to 0.5 weight percent, up to 0.3 weight percent, up to 0.2 weight percent, or up to 0.1 weight percent based on the total weight of monomers.

Suitable thermal initiators include various azo compound such as those commercially available under the trade designation VAZO from Chemours Co. (Wilmington, Del., USA) including VAZO 67, which is 2,2'-azobis(2-methylbutane nitrile), VAZO 64, which is 2,2'-azobis(isobutyronitrile), VAZO 52, which is (2,2'-azobis(2,4-dimethylpentanenitrile), and VAZO 88, which is 1,1'-azobis (cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, Pa., USA) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

In many embodiments, a photoinitiator is used to form the precursor (meth)acrylate copolymer. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation IRGACURE 184), bis(2,4,6-trimethylbenzoyl)phenyl phosphine oxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)

phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA)).

The polymerization of the polymerizable composition to form the precursor (meth)acrylate copolymer can occur in the presence or absence of an organic solvent. If an organic solvent is included in the polymerizable composition, the amount is often selected to provide the desired viscosity. Examples of suitable organic solvents include, but are not limited to, methanol, tetrahydrofuran, ethanol, isopropanol, pentane, hexane, heptane, acetone, methyl ethyl ketone, methyl acetate, ethyl acetate, toluene, xylene, and ethylene glycol alkyl ether. Those organic solvents can be used alone or as mixtures thereof. In many embodiments, the polymerization occurs with little or no organic solvent present. That is the polymerizable composition is free of organic solvent or contains a minimum amount of organic solvent. If used, the organic solvent is often present in an amount less than 10 weight percent, less than 5 weight percent, less than 4 weight percent, less than 3 weight percent, less than 2 weight percent, or less than 1 weight percent based on the total weight of the polymerizable composition.

The precursor (meth)acrylate copolymer can be formed from the polymerizable composition using any suitable method. The polymerization can occur in a single step or in multiple steps. That is, all or a portion of the monomers and/or thermal initiator may be charged into a suitable reaction vessel and polymerized. For example, a polymerizable composition containing an organic solvent and a thermal initiator can be mixed and heated at an elevated temperature such as in a range of 50° C. to 100° C. for several hours.

In some embodiments, the precursor (meth)acrylate copolymer is prepared using an adiabatic process as described, for example, in U.S. Pat. No. 5,986,011 (Ellis et al.) and U.S. Pat. No. 5,637,646 (Ellis). In this polymerization method, the polymerizable composition, including at least one thermal initiator, is sealed in a reaction vessel. The contents are mixed and purged of oxygen and, if not already at induction temperature, then warmed to the induction temperature. The induction temperature, which is usually in the range of 40° C. to 75° C., depends on various factors such as the monomers, the initiator, and the amount of the initiator used. The polymerization is performed under essentially adiabatic conditions with a peak reaction temperature in the range of 100° C. to 200° C. Multiple reaction steps with optional cooling in between steps can be employed to increase polymerization conversion on each successive step and to control the molecular weight. Optionally, various reaction components can be added in multiple steps to control the properties (e.g., molecular weight, molecular weight distribution, and polymer composition) of the resulting polymeric material.

Once the precursor (meth)acrylate is prepared, it is reacted with the unsaturated reagent compound to provide the (meth)acrylate copolymer having pendant (meth)acryloyl groups. The unsaturated reagent compound contains a (meth)acryloyl group and a complementary functional group that reacts with a pendant functional group of the precursor (meth)acrylate copolymer. Generally, the reaction is between nucleophilic and electrophilic functional groups that react by a ring opening, addition, or condensation reaction. When the functional group on the precursor (meth)acrylate copolymer and the complementary functional group of the unsaturated reagent compound react, the resulting (meth)acrylate copolymer will have pendant (meth)acryloyl groups.

Using this "indirect method" of incorporating the pendent (meth)acryloyl groups, preferred reactive functional groups on the precursor (meth)acrylate copolymer include hydroxyl groups, carboxylic acid groups, or anhydride groups. Where the pendant reactive functional group of the precursor includes a hydroxyl group, the complementary functional group of the unsaturated reagent compound is typically a carboxylic acid, isocyanato, epoxy, or anhydride group. Where the pendant reactive functional group of the precursor includes a carboxylic acid group, the complementary functional group of the unsaturated reagent compound is typically a hydroxyl, amino, epoxy, isocyanato, aziridino, azetidino, or oxazolinyl group. When the pendant group of the precursor includes an anhydride, the complementary functional group of the unsaturated reagent compound can be a hydroxyl or amino group.

In certain embodiments, the pendant (meth)acryloyl groups can be formed from the reaction between hydroxyl groups in the precursor (meth)acrylate copolymer and isocyanatoethyl (meth)acrylate as the unsaturated reagent compound. In certain embodiments, the pendant (meth)acryloyl groups can be formed from the reaction between carboxylic acids in the precursor (meth)acrylate copolymer with glycidyl (meth)acrylate as the unsaturated reagent compound. In certain other embodiments, the pendant (meth)acryloyl group can be formed between anhydride groups in the precursor (meth)acrylate copolymer and a hydroxyl functional monomer, such as 2-hydroxyethyl (meth)acrylate or 3-hydroxypropyl (meth)acrylate, as the unsaturated reagent compound.

The reaction between the precursor (meth)acrylate copolymer and the unsaturated reagent compound often occurs at room temperature or at elevated temperatures such as a temperature up to 150° C. or even higher, up to 120° C., up to 100° C., up to 90° C., up to 80° C., up to 60° C., or up to 40° C. Further, this reaction often occurs in the presence of some oxygen since oxygen can inhibit radical propagation. For example, the volume ratio of nitrogen to oxygen is often about 90:10.

All or any fraction of the pendant reactive functional groups of the precursor (meth)acrylate copolymer can be reacted with the unsaturated reagent compound. Up to 100 mole percent, up to 95 mole percent, up to 90 mole percent, up to 85 mole percent, up to 80 mole percent, up to 75 mole percent, up to 70 mole percent, up to 60 mole percent, up to 50 mole percent, up to 40 mole percent, up to 30 mole percent, or up to 20 mole percent and at least 1 mole percent, at least 2 mole percent, at least 5 mole percent, at least 7 mole percent, at least 10 mole percent, at least 12 mole percent, at least 15 mole percent, or at least 20 mole percent of the pendant reactive functional groups of the precursor (meth)acrylate copolymer are reacted with the unsaturated reagent compound. The remaining pendant reactive functional groups after reaction with the unsaturated reagent compound often facilitates miscibility of the (meth)acrylate copolymer having pendant (meth)acryloyl groups with other components of the curable mixture such as the components of the second curable composition.

Stated differently, the (meth)acrylate copolymer having pendant (meth)acryloyl groups often contains at least 0.1 weight percent, at least 0.2 weight percent, at least 0.5 weight percent, at least 1 weight percent, at least 2 weight percent, or at least 5 weight percent and up to 30 weight percent, up to 25 weight percent, up to 20 weight percent, up to 15 weight percent, or up to 10 weight percent monomeric units having a pendant (meth)acryloyl group.

In some embodiments, the pendant reactive functional groups in the precursor (meth)acrylate copolymer are hydroxyl groups and/or carboxylic acid groups. If some of these hydroxyl and/or carboxylic acid groups remain after reaction with the unsaturated reagent compound, the hydroxyl and/or carboxylic acid groups can improve miscibility between the first curable composition and the second curable composition. Additionally, the hydroxyl and/or carboxylic acid groups may react with the epoxy resin in the second curable composition. This can result in a crosslinked network forming between the first cured composition and the second cured composition. The formation of a network may enhance the overlap shear strength of the cured composition.

There are at least 2 pendant (meth)acryloyl groups per chain on average. In some embodiments, on average, there are at least 3, at least 5, at least 10, at least 20, or at least 25 pendant (meth)acryloyl groups per chain. The number of pendant (meth)acryloyl groups per chain can be up to 450 or more, up to 400, up to 350, up to 300, up to 250, up to 200, up to 150, up to 100, up to 75, up to 70, up to 65, up to 60, up to 55, up to 50, up to 45, up to 40, up to 35, or up to 30. If there are too many pendant groups, the partially cured composition formed by curing the first curable composition may be too highly crosslinked to function well as a pressure-sensitive adhesive. That is, the partially cured composition may not have sufficient tack or may not sufficiently wet the substrate to which it is applied to adhere sufficiently. The number of pendant groups that can be present is dependent on the overall composition of the curable mixture. If the amount of the (meth)acrylate copolymer having pendant groups is decreased in the curable mixture, a (meth)acrylate copolymer with a higher number of pendant (meth)acryloyl groups can be used without forming a partially cured composition that is too highly crosslinked.

The number of pendant (meth)acryloyl groups can be calculated based on the weight average molecular weight of the precursor (meth)acrylate copolymer in grams/mole (A), the weight percent of the monomeric unit having a pendant hydroxyl group, carboxylic acid group, or anhydride group in grams (B), the mole fraction of the monomeric units having a pendant hydroxyl group, carboxylic acid group, or anhydride group that is reacted with the unsaturated reagent compound (C), and the molecular weight of the monomeric unit having a pendant hydroxyl group, carboxylic acid group, or anhydride group in grams/mole (D). More specifically, the number of (meth)acryloyl groups per chain is equal to (A)(B)(C)+(D) where (A), (B), (C), and (D) are defined above.

Alternatively, the number of pendant (meth)acryloyl groups can be calculated based on the weight average molecular weight of the precursor (meth)acrylate copolymer in grams/mole (A), the moles of unsaturated reagent compound reacted with the precursor (meth)acrylate copolymer (E), and the amount in grams of the precursor (meth)acrylate copolymer treated with the unsaturated reagent compound (F). More specifically, the number of (meth)acryloyl groups per chain is equal to (A)(E)+(F) where (A), (E), and (F) are defined above.

In some embodiments, the (meth)acrylate copolymer having pendant (meth)acryloyl groups often contains 50 to 99.9 weight percent monomeric units derived from a (hetero) alkyl (meth)acrylate, 0.1 to 30 weight percent monomeric units having a pendant (meth)acryloyl group, and 0 to 29.9 weight percent monomeric units derived from a monomer having a pendant hydroxyl group, carboxylic acid group, or anhydride group, and 0 to 20 weight percent monomeric units derived from optional monomers as defined above. For example, the (meth)acrylate copolymer having pendant (meth)acryloyl groups often contains 70 to 99.9 weight percent monomeric units derived from a (hetero)alkyl (meth)acrylate, 0.1 to 30 weight percent monomeric units having a pendant (meth)acryloyl group, and 0 to 29.9 weight percent monomeric units derived from a monomer having a pendant hydroxyl group, carboxylic acid group, or anhydride group, and 0 to 20 weight percent monomeric units derived from optional monomers. The amount values are based on a total weight of the (meth)acrylate copolymer having pendant (meth)acryloyl groups.

In other embodiments, the (meth)acrylate copolymer having pendant (meth)acryloyl groups often contains 70 to 99 weight percent monomeric units derived from a (hetero) alkyl (meth)acrylate, 1 to 30 weight percent monomeric units having a pendant (meth)acryloyl group, and 0 to 29 weight percent monomeric units derived from a monomer having a pendant hydroxyl group, carboxylic acid group, or anhydride group, and 0 to 20 weight percent monomeric units derived from optional monomers. For example, the (meth)acrylate copolymer having pendant (meth)acryloyl groups can contain 70 to 99 weight percent monomeric units derived from a (hetero)alkyl (meth)acrylate, 1 to 20 weight percent monomeric units having a pendant (meth)acryloyl group, and 0 to 29 weight percent monomeric units derived from a monomer having a pendant hydroxyl group, carboxylic acid group, or anhydride group, and 0 to 20 weight percent monomeric units derived from optional monomers. In other examples, the (meth)acrylate copolymer having pendant (meth)acryloyl groups has 70 to 99 weight percent monomeric units derived from a (hetero)alkyl (meth)acrylate, 1 to 10 weight percent monomeric units having a pendant (meth)acryloyl group, and 0 to 29 weight percent monomeric units derived from a monomer having a pendant hydroxyl group, carboxylic acid group, or anhydride group, and 0 to 20 weight percent monomeric units derived from optional monomers. In still other examples, the (meth)acrylate copolymer having pendant (meth)acryloyl groups has 70 to 99 weight percent monomeric units derived from a (hetero)alkyl (meth)acrylate, 1 to 5 weight percent monomeric units having a pendant (meth)acryloyl group, and 0 to 29 weight percent monomeric units derived from a monomer having a pendant hydroxyl group, carboxylic acid group, or anhydride group, and 0 to 20 weight percent monomeric units derived from optional monomers.

In other examples, the (meth)acrylate copolymer having pendant (meth)acryloyl groups can contain 80 to 99 weight percent monomeric units derived from a (hetero)alkyl (meth)acrylate, 1 to 20 weight percent monomeric units having a pendant (meth)acryloyl group, and 0 to 19 weight percent monomeric units derived from a monomer having a pendant hydroxyl group, carboxylic acid group, or anhydride group. In other examples, the (meth)acrylate copolymer having pendant (meth)acryloyl groups has 80 to 99 weight percent monomeric units derived from a (hetero) alkyl (meth)acrylate, 1 to 10 weight percent monomeric units having a pendant (meth)acryloyl group, and 0 to 19 weight percent monomeric units derived from a monomer having a pendant hydroxyl group, carboxylic acid group, or anhydride group. In still other examples, the (meth)acrylate copolymer having pendant (meth)acryloyl groups has 80 to 99 weight percent monomeric units derived from a (hetero) alkyl (meth)acrylate, 1 to 5 weight percent monomeric units having a pendant (meth)acryloyl group, and 0 to 19 weight percent monomeric units derived from a monomer having a pendant hydroxyl group, or carboxylic acid group.

The (meth)acrylate copolymer having pendant (meth)acryloyl groups typically has a weight average molecular weight in a range of 35,000 Daltons to 300,000 Daltons. The weight average molecular weight is typically determined by gel permeation chromatography as described in the Examples. If the weight average molecular weight of the (meth)acrylate copolymer having pendant (meth)acryloyl groups is less than 35,000 Daltons, the overlap shear strength of the final cured composition may be unacceptably low. If the weight average molecular weight of the (meth)acrylate copolymer having pendant (meth)acryloyl groups is too high, however, the viscosity of the curable mixture may be unacceptably high. The weight average molecular weight of the (meth)acrylate copolymer having pendant (meth)acryloyl groups is often at least 40,000 Daltons, at least 60,000 Daltons, at least 80,000 Daltons, at least 100,000 Daltons and can be up to 275,000 Daltons, up to 250,000 Daltons, up to 200,000 Daltons, up to 175,000 Daltons, up to 150,000 Daltons, or up to 125,000 Daltons In some embodiments, the weight average molecular weight is in a range of 35,000 to 300,000 Daltons, 50,000 to 300,000 Daltons, 35,000 to 250,000 Daltons, 50,000 to 250,000 Daltons, or 100,000 to 250,000 Daltons.

The glass transition temperature of the (meth)acrylate copolymer having pendant (meth)acryloyl groups can be measured using the Fox equation based on the amount and identity of the monomeric units.

$$1/T_{g\,mix} = \Sigma w_i / T_{gi}$$

In this equation, $T_{g\,mix}$ refers to the glass transition temperature of the mixture, which can refer to the precursor (meth)acrylate copolymer or to the (meth)acrylate copolymer having at least two pendant (meth)acryloyl groups. $T_{gi}$ is the glass transition temperature of each component i, (i.e., each component is a different monomeric unit in the copolymer) and $w_i$ is the mass fraction of each component i. Both $T_{gi}$ and $T_{g\,mix}$ are in degrees Kelvin for purposes of the Fox equation but are often reported in degrees Celsius. The glass transition temperature of each component (i.e., monomer) is the glass transition temperature of a homopolymer formed from that monomer. Further information about the Fox equation and its use can be found in various reference texts for polymeric materials such as, for example, Hiemenz and Lodge, *Polymer Chemistry, Second Edition*, 2007, pp. 492-495. Tables of glass transition temperatures for homopolymers are available from various suppliers of monomer such as, for example, Sigma-Aldrich, Polyscience, and BASF. In most embodiments, the glass transition temperature of the precursor (meth)acrylate copolymer as well as the glass transition temperature of the (meth)acrylate copolymer having pendant (meth)acryloyl groups are no greater than 40° C., no greater than 20° C., no greater than 10° C., no greater than 0° C., no greater than −10° C., or no greater than −20° C.

The curable mixture typically contains at least 2 weight percent of the (meth)acrylate copolymer having at least two pendant (meth)acryloyl groups based on the total weight of the curable mixture. If the curable mixture contains less than 2 weight percent of this copolymer, the partially cured composition that is a pressure-sensitive adhesive may not have enough holding power or cohesive strength. The curable mixture typically contains up to 75 weight percent of the (meth)acrylate copolymer having at least two pendant (meth)acryloyl groups. If the curable mixture contains more than 75 weight percent of this copolymer, the partially cured composition is often a pressure-sensitive adhesive that is too highly crosslinked, that is not sufficiently tacky, and that doesn't adequately wet out the surface of the substrate to which it is applied. Further, if the amount of the (meth)acrylate copolymer having pendant (meth)acryloyl groups is too great, there may be an insufficient amount of the epoxy resin to result in the preparation of a cured composition with sufficient overlap shear strength.

In some embodiments, the curable mixture contains at least 2 weight percent, at least 3 weight percent, at least 4 weight percent, at least 5 weight percent, at least 7 weight percent, at least 8 weight percent, or at least 10 weight percent of the (meth)acrylate copolymer having at least two pendant (meth)acryloyl groups. The amount can be up to 75 weight percent, up to 70 weight percent, up to 65 weight percent, up to 60 weight percent, up to 55 weight percent, up to 50 weight percent, up to 45 weight percent, up to 40 weight percent, up to 35 weight percent, up to 30 weight percent, up to 25 weight percent, up to 20 weight percent, or up to 15 weight percent. In some examples, the amount is in a range of 2 to 75 weight percent, 2 to 70 weight percent, 2 to 60 weight percent, 2 to 50 weight percent, 2 to 40 weight percent, 2 to 30 weight percent, 4 to 70 weight percent, 4 to 60 weight percent, 4 to 50 weight percent, 4 to 40 weight percent, 4 to 30 weight percent, 5 to 60 weight percent, 5 to 50 weight percent, 5 to 40 weight percent, 8 to 60 weight percent, 8 to 50 weight percent, 8 to 40 weight percent, 10 to 60 weight percent, 10 to 50 weight percent, or 10 to 40 weight percent. The amounts are based on a total weight of the curable mixture.

Free radical photoinitiator A free radical photoinitiator is added to initiate reaction of the pendant (meth)acryloyl groups on the (meth)acrylate copolymer. The free radical photoinitiator is selected so that it is sensitive to actinic radiation of a first wavelength. The first wavelength is selected to activate the free radical photoinitiator in the first curable composition but not to activate the photo-acid generator included in the second curable composition. The first wavelength of actinic radiation is in a wavelength range of 200 to 800 nanometers and the free radical photoinitiator is selected so that it can generate free radicals when exposed to actinic radiation in this wavelength range. In many embodiments, the first wavelength of actinic radiation is in the visible or near ultraviolet region of the electromagnetic spectrum and the free radical photoinitiator is selected so that it is activated at wavelengths of at least 380 nanometers such as in a range of 380 to 800 nanometers, 380 to 600 nanometers, 380 to 500 nanometers, 380 to 450 nanometers, 380 to 420 nanometers, or 380 to 415 nanometers.

Examples of suitable free radical photoinitiators include, but are not limited to, alpha aminoketones, alpha hydroxyketones, phosphine oxides (e.g., acyl phosphine oxides), phenylglyoxalates, thioxanthones, benzophenones, benzoin ethers, oxime esters, substituted acetophenones such as 2,2-dimethoxy-2-phenylacetophonone (commercially available under the trade designation IRGACURE 651 from BASF), amine synergists, maleimides, and combinations thereof.

In many embodiments, the free radical photoinitiator is an acyl phosphine oxide such as those described, for example, in U.S. Pat. No. 4,737,593 (Ellrich et al.). The acyl phosphine oxides are often of Formula (I) or (II).

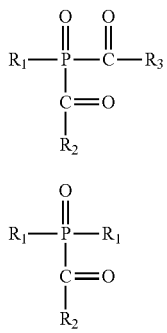

(I)

(II)

In Formulas (I) and (II), each $R_1$ is independently a linear or branched alkyl having 1 to 18 carbon atoms, a cycloalkyl having 5 to 6 ring members (i.e., cyclopentyl and cyclohexyl), a substituted cycloalkyl, an aryl (e.g., phenyl, biphenyl, and naphthyl), a substituted aryl, or a heterocyclic ring with 5 or 6 ring members and having one or more sulfur, nitrogen, or oxygen heteroatoms. Suitable substituents for substituted aryl and substituted cycloalkyl groups include halo groups (e.g., F, Cl, Br, and I), alkyl groups (e.g., alkyl groups with 1 to 10 carbon atoms, 1 to 6 carbon atoms, or 1 to 4 carbon atom), or alkoxy groups (e.g., alkoxy groups with 1 to 10 carbon atoms, 1 to 6 carbon atoms, or 1 to 4 carbon atoms).

Each $R_2$ in Formulas (I) and (II) and each $R_3$ in Formula (I) is independently a cycloalkyl having 5 to 6 ring members (i.e., cyclopentyl and cyclohexyl), a substituted cycloalkyl, an aryl (e.g., phenyl, biphenyl, and naphthyl), a substituted aryl, or a heterocyclic ring having one or more sulfur, nitrogen, or oxygen heteroatoms and having 5 or 6 ring members. Suitable substituents for substituted aryl and substituted cycloalkyl groups include halo groups (e.g., F, Cl, Br, and I), alkyl groups (e.g., alkyl groups with 1 to 10 carbon atoms, 1 to 6 carbon atoms, or 1 to 4 carbon atom), or alkoxy groups (e.g., alkoxy groups with 1 to 10 carbon atoms, 1 to 6 carbon atoms, or 1 to 4 carbon atoms). Groups $R_2$ and $R_3$ in Formula (I) can combine to form a ring that contains 4 to 10 carbon atoms that can optionally be substituted with one or more alkyl groups (e.g., 1 to 6 alkyl groups).

In some embodiments, the acyl phosphine is of Formula (I) where $R_1$ is aryl, $R_2$ is an aryl substituted with an alkyl or alkoxy, and $R_3$ is an aryl substituted with an alkyl or alkoxy. In some particular embodiments, the acyl phosphine is bis(2,4,6-trimethylbenzoyl)phenyl phosphine oxide, which is commercially available under the trade designation IRGACURE 819 from Ciba Specialty Chemicals.

In other embodiments, the acyl phosphine is of Formula (II) where each $R_1$ is any aryl and $R_2$ is an aryl substituted with an alkyl or alkoxy. For example, the acyl phosphine can be diphenyl(2,4,6-trimethylbenzoyl) phosphine oxide, which is commercially available under the trade designation TPO from Millipore Sigma (formerly Sigma Aldrich), St. Louis, Mo., USA.

In still other embodiments, the acyl phosphine is of Formula (II) where a first $R_1$ is an aryl, a second $R_1$ is an alkyl, and $R_2$ is an aryl substituted with an alkyl. For example, the acyl phosphine can be ethyl(2,4,6-trimethylbenzoyl)phenyl phosphinate, which is commercially available under the trade designation TPO-L from Lambson, Wetherby, West Yorkshire, England.

The free radical photoinitiator used to provide the partially cured composition is generally present in an amount equal to at least 0.01 weight percent, at least 0.02 weight percent, at least 0.05 weight percent, at least 0.1 weight percent, at least 0.5 weight percent, or at least 1 weight percent based on a total weight of the curable mixture. The free radical photoinitiator can be used in an amount of up to 5 weight percent, up to 3 weight percent, up to 2 weight percent, or up to 1 weight percent based on a total weight of the curable mixture. In some examples, the amount is in a range of 0.01 to 5 weight percent, 0.1 to 5 weight percent, 0.1 to 3 weight percent, 0.1 to 2 weight percent, 0.1 to 1 weight percent, 0.5 to 5 weight percent, 0.5 to 3 weight percent, or 0.5 to 2 weight percent based on a total weight of the curable mixture.

Optional Monomers

Optional free-radically polymerizable monomers can be included in the first curable composition, if desired. These monomers can be added for a variety of reasons such as to lower the viscosity of the curable composition or to further enhance the overlap shear strength of the cured composition by the addition of crosslinking monomers.

In some embodiments, the monomer added is (hetero) alkyl (meth)acrylate that is added to lower the viscosity of the curable mixture. That is, this monomer is added rather than adding an organic solvent or to minimize the amount of organic solvent that is added. The monomer is selected to be miscible with the other components in the curable mixture. Any of the (hetero)alkyl (meth)acrylate monomers described above can be used. In some embodiments, the optional (hetero)alkyl (meth)acrylate monomer is added after preparation of the precursor (meth)acrylate copolymer but before reaction of the precursor (meth)acrylate copolymer with the unsaturated reagent compound. Because the reaction with the unsaturated reagent compound often occurs at an elevated temperature, monomers that will not evaporate during this reaction are often selected. That is, the optional (hetero)alkyl (meth)acrylate is often selected to have a boiling point greater than 60° C., greater than 70° C., greater than 80° C., or greater than 90° C. Suitable examples include, but are not limited to, cyclic alkyl (meth)acrylates such as isobornyl (meth)acrylate, 3,3,5-trimethylcyclohexyl (meth)acrylate, cyclohexyl (meth)acrylate, and 4-tert-butylcyclohexyl (meth)acrylate.

The amount of the optional (hetero)alkyl (meth)acrylate is often in a range of 0 to 50 weight percent based on a total weight of (meth)acrylate copolymer having pendant (meth) acryloyl groups. In some embodiments, there is at least 1 weight percent, at least 2 weight percent, at least 3 weight percent, at least 5 weight percent, or at least 10 weight percent of the optional (hetero)alkyl (meth)acrylate. The amount can be up to 45 weight percent, up to 40 weight percent, up to 35 weight percent, up to 30 weight percent, up to 25 weight percent, or up to 20 weight percent. In some embodiments, the amount of the optional (hetero)alkyl (meth)acrylate is in a range of 1 to 50 weight percent, 2 to 50 weight percent, 5 to 50 weight percent, 0 to 40 weight percent, 1 to 40 weight percent, 5 to 40 weight percent, 5 to 35 weight percent, 0 to 30 weight percent, 1 to 30 weight percent, 5 to 30 weight percent, 1 to 25 weight percent, 5 to 25 weight percent, 10 to 50 weight percent, 10 to 40 weight percent, 10 to 30 weight percent, 10 to 25 weight percent, 1 to 20 weight percent, 1 to 15 weight percent, 1 to 10 weight percent, 2 to 10 weight percent, 2 to 8 weight percent, or 2 to 6 weight percent based on the weight of the (meth) acrylate copolymer having pendant (meth)acryloyl groups.

Crosslinking monomers can be added to the first curable composition. Crosslinking monomers have at least two free radically polymerizable groups, which are typically (meth) acryloyl groups. Examples of crosslinking monomers with two (meth)acryloyl groups include, but are not limited to, glycerol di(meth)acrylate, hexanediol di(meth)acrylate, triethylene glycol di(meth)acrylate, 1,3-propanediol di(meth) acrylate, 1,6-hexanediol di(meth)acrylate, 1,4-cyclohexanediol di(meth)acrylate, urethane di(meth)acrylate, and polyethylene glycol di(meth)acrylates. Examples of crosslinking monomers with three (meth)acryloyl groups include, but are not limited to, glycerol tri(meth)acrylate, trimethylolpropane tri(meth)acrylate, 1,2,4-butanetriol tri(meth)acrylate, and pentaerythritol tri(meth)acrylate. Examples of crosslinking monomers with four or more (meth)acryloyl groups include, but are not limited to, pentaerythritol tetra (meth)acrylate, sorbitol hexa(meth)acrylate.

The amount of the optional crosslinking monomers is often in a range of 0 to 10 weight percent based on a total weight of the curable mixture. In some embodiments, there is at least 1 weight percent, at least 2 weight percent, or at least 3 weight percent and the amount can be up to 9 weight percent, up to 8 weight percent, up to 7 weight percent, up to 6 weight percent, or up to 5 weight percent. In some examples, the amount of the optional crosslinking monomer is in a range of 1 to 10 weight percent, 2 to 10 weight percent, 0 to 8 weight percent, 1 to 8 weight percent, 2 to 8 weight percent, 0 to 6 weight percent, 1 to 6 weight percent, 2 to 6 weight percent, 0 to 5 weight percent, 1 to 5 weight percent, or 2 to 5 weight percent.

Second Curable Composition

The second curable composition contains (1) an epoxy resin, (2) a polyether polyol, and (3) a photo-acid generator that is sensitive to actinic radiation of a second wavelength and that is not sensitive to actinic radiation of the first wavelength. The second curable composition is miscible with the first curable composition. That is, there is no phase separation between the components of the first curable composition and the second curable composition. The second wavelength of actinic radiation is often in the ultraviolet region of the electromagnetic spectrum.

Epoxy Resin

The epoxy resin that is included in the second curable composition has at least one epoxy functional group (i.e., oxirane group) per molecule. As used herein, the term oxirane group refers to the following divalent group.

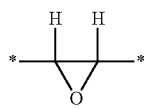

The asterisks denote a site of attachment of the oxirane group to another group. If the oxirane group is at the terminal position of the epoxy resin, the oxirane group is typically bonded to a hydrogen atom.

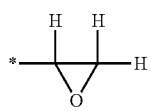

This terminal oxirane group is often (and preferably) part of a glycidyl group.

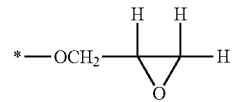

The epoxy resin often has at least one oxirane group per molecule and often has at least two oxirane groups per molecule. For example, the epoxy resin can have 1 to 10, 2 to 10, 1 to 6, 2 to 6, 1 to 4, or 2 to 4 oxirane groups per molecule. The oxirane groups are usually part of a glycidyl group.

Epoxy resins can be a single material or a mixture of materials selected to provide the desired viscosity characteristics before curing and to provide the desired mechanical properties after curing. If the epoxy resin is a mixture of materials, at least one of the epoxy resins in the mixture is typically selected to have at least two oxirane groups per molecule. For example, a first epoxy resin in the mixture can have two to four oxirane groups and a second epoxy resin in the mixture can have one to four oxirane groups. In some of these examples, the first epoxy resin is a first glycidyl ether with two to four glycidyl groups and the second epoxy resin is a second glycidyl ether with one to four glycidyl groups.

The portion of the epoxy resin molecule that is not an oxirane group (i.e., the epoxy resin molecule minus the oxirane groups) can be aromatic, aliphatic or a combination thereof and can be linear, branched, cyclic, or a combination thereof. The aromatic and aliphatic portions of the epoxy resin can include heteroatoms or other groups that are not reactive with the oxirane groups. That is, the epoxy resin can include halo groups, oxy groups such as in an ether linkage group, carbonyl groups, carbonyloxy groups, and the like. The epoxy resin can also be a silicone-based material such as a polydiorganosiloxane-based material.

Although the epoxy resin can have any suitable molecular weight, the weight average molecular weight is usually at least 100 Daltons, at least 150 Daltons, at least 175 Daltons, at least 200 Daltons, at least 250 Daltons, or at least 300 Daltons. The weight average molecular weight can be up to 1000 Daltons or even higher for polymeric epoxy resins. If the weight average molecular weight is too high, the curable mixture may be too viscous or stringy for printing and/or dispensing. The weight average molecular weight is often up to 900 Daltons, up to 800 Daltons, up to 700 Daltons, up to 600 Daltons, or up to 500 Daltons. For example, the weight average molecular weight can be in the range of 100 to 1000 Daltons, 100 to 800 Daltons, 100 to 600 Daltons, 100 to 500 Daltons, 200 to 1000 Daltons, 200 to 800 Daltons, 200 to 600 Daltons, 200 to 500 Daltons, 300 to 1000 Daltons, 300 to 800 Daltons, 300 to 600 Daltons, or 300 to 500 Daltons.

The equivalent weight of the epoxy resin, which refers to the weight of resin in grams that contains one equivalent of epoxy, is often no greater than 500 grams/equivalent, no greater than 450 grams/equivalent, no greater than 400 grams/equivalent, no greater than 375 grams/equivalent, no greater than 350 grams/equivalent, no greater than 325 grams/equivalent, no great than 300 grams/equivalent, no greater than 275 grams/equivalent, or no greater than 250 grams/equivalent and is often at least 50 grams/equivalent, at least 75 grams/equivalent, at least 100 grams/equivalent, at least 125 grams/equivalent, or at least 150 grams/equivalent. In some embodiments, the equivalent weight is often in a range of 50 to 500 grams/equivalent, 100 to 400 grams/equivalent, 100 to 300 grams/equivalent, or 150 to 250 grams/equivalent.

Suitable epoxy resins are typically a liquid at room temperature (e.g., about 20° C. to about 25° C.). However, combinations of epoxy resins can be used. Although less desirable, epoxy resins that are not liquids at room temperature can be used provided they can be dissolved in a suitable organic solvent or in other components of the curable mixture such that the curable mixture has a viscosity that is suitable for printing or dispensing. In most embodiments, the epoxy resin is a glycidyl ether. Exemplary glycidyl ethers can be of Formula (III).

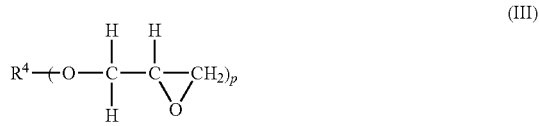

In Formula (III), group $R^4$ is a p-valent group that is aromatic, aliphatic, or a combination thereof. Group $R^4$ can be linear, branched, cyclic, or a combination thereof. Group $R^4$ can optionally include halo groups, oxy groups, carbonyl groups, carbonyloxy groups, and the like. Although the variable p can be any suitable integer greater than or equal to 1, p is often an integer in the range of 2 to 4. In many embodiments, p is equal to 2.

In some exemplary epoxy resins of Formula (III), the variable p is equal to 2 (i.e., the epoxy resin is a diglycidyl ether) and $R^4$ includes an alkylene (i.e., an alkylene is a divalent radical of an alkane and can be referred to as an alkane-diyl), heteroalkylene (i.e., a heteroalkylene is a divalent radical of a heteroalkane and can be referred to as a heteroalkane-diyl), arylene (i.e., a divalent radical of an arene compound), or mixture thereof. Suitable alkylene groups often have 1 to 20 carbon atoms, 1 to 12 carbon atoms, 1 to 8 carbon atoms, or 1 to 4 carbon atoms. Suitable heteroalkylene groups often have 2 to 50 carbon atoms, 2 to 40 carbon atoms, 2 to 30 carbon atoms, 2 to 20 carbon atoms, 2 to 10 carbon atoms, or 2 to 6 carbon atoms. The heteroatoms in the heteroalkylene are often oxy groups. Suitable arylene groups often have 6 to 18 carbon atoms or 6 to 12 carbon atoms. For example, the arylene can be phenylene. Group $R^4$ can further optionally include halo groups, oxy groups, carbonyl groups, carbonyloxy groups, and the like.

Some epoxy resins of Formula (III) are diglycidyl ethers where $R^4$ includes (a) an arylene group or (b) an arylene group in combination with an alkylene, heteroalkylene, or both. Group $R^4$ can further include optional groups such as halo groups, oxy groups, carbonyl groups, carbonyloxy groups, and the like. These epoxy resins can be prepared, for example, by reacting an aromatic compound having at least two hydroxyl groups with an excess of epichlorohydrin. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, and p,p'-dihydroxybenzophenone. Still other examples include the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Some commercially available diglycidyl ether epoxy resins of Formula (III) are derived from bisphenol A (i.e., bisphenol A is 4,4'-dihydroxydiphenylmethane). Examples include, but are not limited to, those available under the trade designation EPON (e.g., EPON 828, EPON 872, and EPON 1001) from Hexion Specialty Chemicals, Inc. in Houston, Tex., those available under the trade designation DER (e.g., DER 331, DER 332, and DER 336) from Dow Chemical Co. in Midland, Mich., and those available under the trade designation EPICLON (e.g., EPICLON 850) from Dainippon Ink and Chemicals, Inc. in Chiba, Japan. Other commercially available diglycidyl ether epoxy resins are derived from bisphenol F (i.e., bisphenol F is 2,2'-dihydroxydiphenylmethane). Examples include, but are not limited to, those available under the trade designation DER (e.g., DER 334) from Dow Chemical Co. and those available under the trade designation EPICLON (e.g., EPICLON 830) from Dainippon Ink and Chemicals, Inc.

Other epoxy resins of Formula (III) are diglycidyl ethers of a poly(alkylene oxide) diol. These epoxy resins can be referred to as diglycidyl ethers of a poly(alkylene glycol) diol. The variable p is equal to 2 and $R^4$ is a heteroalkylene having oxygen heteroatoms. The poly(alkylene glycol) can be copolymer or homopolymer. Examples include, but are not limited to, diglycidyl esters of poly(ethylene oxide) diol, diglycidyl esters of poly(propylene oxide) diol, and diglycidyl esters of poly(tetramethylene oxide) diol. Epoxy resins of this type are commercially available from Polysciences, Inc. (Warrington, Pa., USA) such as those derived from a poly(ethylene oxide) diol or from a poly(propylene oxide) diol having a weight average molecular weight of about 400 Daltons, about 600 Daltons, or about 1000 Daltons.

Still other epoxy resins of Formula (III) are diglycidyl ethers of an alkane diol ($R^4$ is an alkylene and the variable p is equal to 2). Examples include a diglycidyl ether of 1,4-dimethanol cyclohexyl, diglycidyl ether of 1,4-butanediol, and diglycidyl ethers of the cycloaliphatic diol formed from a hydrogenated bisphenol A such as those commercially available under the trade designation EPONEX 1510 from Hexion Specialty Chemicals, Inc. (Houston, Tex., USA).

Yet other epoxy resins include silicone resins with at least two glycidyl groups and flame retardant epoxy resins with at least two glycidyl groups (e.g., a brominated bisphenol-type epoxy resin having with at least two glycidyl groups such as that commercially available from Dow Chemical Co. in (Midland, Mich., USA) under the trade designation DER 580).

The epoxy resin is often a mixture of materials. For example, the epoxy resins can be selected to be a mixture that provides the desired viscosity or flow characteristics prior to curing. The mixture can include at least one first epoxy resin that is referred to as a reactive diluent that has a lower viscosity and at least one second epoxy resin that has a higher viscosity. The reactive diluent tends to lower the viscosity of the epoxy resin mixture and often has either a branched backbone that is saturated or a cyclic backbone that is saturated or unsaturated. Examples include, but are not limited to, the diglycidyl ether of resorcinol, the diglycidyl ether of cyclohexane dimethanol, the diglycidyl ether of neopentyl glycol, and the triglycidyl ether of trimethylolpropane. Diglycidyl ethers of cyclohexane dimethanol are commercially available under the trade designation HELOXY MODIFIER 107 from Hexion Specialty Chemicals (Columbus, Ohio, USA) and under the trade designation EPODIL 757 from Air Products and Chemical Inc. (Allentown, Pa., USA). Other reactive diluents have only one functional group (i.e., oxirane group) such as various monoglycidyl ethers. Some exemplary monoglycidyl ethers include, but are not limited to, alkyl glycidyl ethers with an alkyl group having 1 to 20 carbon atoms, 1 to 12 carbon atoms, 1 to 8 carbon atoms, or 1 to 4 carbon atoms. Some exemplary monoglycidyl ethers are commercially available under the trade designation EPODIL from Air Products and Chemical, Inc. in Allentown, Pa., USA such as EPODIL 746 (2-ethylhexyl glycidyl ether), EPODIL 747 (aliphatic glycidyl ether), and EPODIL 748 (aliphatic glycidyl ether).

In many embodiments, 100 weight percent of the epoxy resin is of Formula (III). In other embodiments, at least 95 weight percent, at least 90 weight percent, at least 85 weight percent, at least 80 weight percent, at least 75 weight percent, or at least 70 weight percent of the epoxy resin is of Formula (III). Typically, there are no more than 30 weight percent, no more than 25 weight percent, no more than 20 weight percent, or no more than 15 weight percent, no more than 10 weight percent, no more than 5 weight percent, or no more than 1 weight percent of the epoxy resin is a compound that has an oxirane group that is not a glycidyl group.

In many embodiment, 100 weight percent of the epoxy resin is a diglycidyl ether (i.e., a compound of Formula (III) with p equal to 2). In other embodiments, the epoxy resin is a mixture of compounds of Formula (III) with p equal to 2 and compounds of Formula (III) with p not equal to 2. In such mixtures, the amount of the diglycidyl ether is often at least 50 weight percent, at least 60 weight percent, at least 70 weight percent, at least 75 weight percent, at least 80 weight percent, at least 85 weight percent, at least 90 weight percent, or at least 95 weight percent based on the total weight of the epoxy resin.

In most embodiments, the epoxy resin is free of compounds that have an oxirane group that is not a glycidyl group. If such compounds are included, however, they typically make up less than 30 weight percent, less than 20 weight percent, less than 10 weight percent, less than 5 weight percent, less than 2 weight percent, less than 1 weight percent, or less than 0.5 weight percent based on the total weight of the epoxy resin.

The curable mixture usually contains at least 10 weight percent epoxy resin. If the curable mixture contains less than 10 weight percent epoxy resin, there may be an insufficient amount of the epoxy resin to result in the preparation of a cured composition with a suitable overlap shear strength. Further, the partially cured composition may be a pressure-sensitive adhesive that is too highly crosslinked, that is not sufficiently tacky, and that doesn't adequately wet out the surface of the substrate to which it is applied. The curable mixture usually contains up to 80 weight percent of the epoxy resin based on the total weight of the curable mixture. If the curable mixture contains more than 80 weight percent epoxy resin, the fully cured composition will have good structural adhesive properties such as good overlap shear but the partially cured composition may not function adequately as a pressure-sensitive adhesive. There is a need to balance the handling ability of the partially cured composition with the final structural adhesive strength of the cured composition.

The amount of the epoxy resin can be at least 10 weight percent, at least 15 weight percent, at least 20 weight percent, at least 25 weight percent, at least 30 weight percent, at least 35 weight percent, or at least 40 weight percent and can be up to 80 weight percent, up to 75 weight percent, up to 70 weight percent, up to 65 weight percent, up to 60 weight percent, up to 55 weight percent, up to 50 weight percent, or up to 45 weight percent based on a total weight of the curable mixture. In some examples, the amount of epoxy resin is in a range of 10 to 80 weight percent, 10 to 75 weight percent, 10 to 70 weight percent, 10 to 65 weight percent, 10 to 60 weight percent, 10 to 55 weight percent, 10 to 50 weight percent, 15 to 75 weight percent, 15 to 70 weight percent, 15 to 65 weight percent, 15 to 60 weight percent, 15 to 55 weight percent, 15 to 50 weight percent, 20 to 75 weight percent, 20 to 70 weight percent, 20 to 60 weight percent, 20 to 50 weight percent, 25 to 75 weight percent, 25 to 70 weight percent, 25 to 65 weight percent, 25 to 60 weight percent, 25 to 55 weight percent, or 25 to 50 weight percent. The amounts are based on a total weight of the curable mixture.

The weight ratio of the (meth)acrylate copolymer having pendant (meth)acryloyl groups to epoxy resin is typically in a range of 1:20 to 1:0.5. Stated differently, the amount of (meth)acrylate copolymer having pendant (meth)acryloyl groups can vary from being 20 times less than the amount of the epoxy resin to 2 times more than the amount of the epoxy resin. In some embodiments, the weight ratio is at least 1:18, at least 1:15, at least 1:12, at least 1:10, at least 1:5, or at least 1:4 and can be up to 1:3, up to 1:2, or up to 1:1. The weight ratio is often in a range of 1:18 to 1:0.5, 1:18 to 1:1, 1:15 to 1:0.5, 1:15 to 1:1, 1:10 to 1:0.5, or 1:10 to 1:1.

Polyether Polyol

The second curable composition includes a polyether polyol. More particularly, the polyether polyols have at least two or at least 3 hydroxyl groups. The polyether polyols are typically polyether diols such as polyoxyalkylene glycols. Some example polyoxyalkyene glycols include, but are not limited to, polyoxyethylene glycols, polyoxypropylene glycols, and polyoxybutylene glycols (which can also be referred to as poly(tetramethylene oxide) glycols or poly(tetrahydrofuran) glycol). Other suitable polyether polyols are polyether triols such as polyoxyalkylene triols. These triols can be derived from glycerol. Examples include, but are not limited to, polyoxyetheylene triol and polyoxypropylene triol. The polyether polyol is typically miscible with the other components of the curable mixture such as the epoxy resin and the (meth)acrylate copolymer having pendant (meth)acryloyl groups.

The polyether polyols can be characterized by their hydroxyl number, which refers to milligrams of KOH per gram of hydroxyl-containing material. This can be determined, for example, by adding an excess of an acidic material that reacts with the polyether polyol and then by back titrating the remaining acidic material with a base to determine the amount of hydroxyl groups per gram of polyether polyol. The amount of hydroxyl groups is reported as though they were from the basic material KOH. The hydroxyl number (mg KOH per gram of polyether polyol) is usually at least 10, at least 25, at least 50, at least 75, at least 100, at least 125, at least 150, at least 175, or at least 200 and can be up to 700, up to 650, up to 600, up to 550, up to 500, up to 450, up to 400, up to 350, up to 300, or up to 250.

In some embodiments, the polyether polyol is a liquid at room temperature. In other embodiments, the polyether polyol is a liquid at temperatures above 40° C. The polyether polyols that are not liquids at room temperature are often soluble in the other components of the curable mixture or can be dissolved, if necessary, in an optional organic solvent. For example, the weight average molecular weight can be up to 50,000 Daltons, up to 40,000 Daltons, up to 20,000 Daltons, up to 10,000 Daltons, or up to 5,000 Daltons. The desired lower weight average molecular weight of the polyether polyol can be used provided the hydroxyl number is suitable. For example, the weight average molecular weight is often at least 500 Daltons, at least 750 Daltons, at least 1,000 Daltons, at least 1,500 Daltons, or at least 2,000 Daltons.

Suitable polytetramethylene oxide glycols include, for example, those commercially available under the trade designation POLYMEG from LyondellBasell, Inc. (Jackson, Tenn., USA), under the trade designation TERATHANE from Invista (Newark, Del., USA), and under the trade designation POLYTHF from BASF Corp. (Charlotte, N.C., USA). Suitable polyoxypropylene polyols include those commercially available under the trade designation ARCOL from Bayer Material Science (Los Angeles, Calif., USA). Still other polyether polyols are commercially available under the trade designation VORANOL from Dow Automotive Systems (Auburn Hills, Mich., USA).

The polyether polyols tend to retard the curing reaction of the second curable composition. That is, the polyether polyol tends to increase the "open time" of the second curable composition. As used herein, the term "open time" refers to the time after the curable composition has been irradiated with actinic radiation of the second wavelength, during which the curable mixture remains sufficiently uncured for a second substrate to be bonded thereto.

The open time of the curable mixture (more particularly, the second curable composition) is desirably at least 2 minutes after exposure to an energy dose of about 1.6 J/cm$^2$ of UV-A actinic radiation of the second wavelength. In some embodiments, the second wavelength is provided using LED lights with an energy dose of 5.6 to 7.4 J/cm$^2$. If one or both substrates that are being bonded together are translucent for the radiation to which the partially cured composition containing the second curable composition is to be exposed, however, the open time is of no relevance because in that case the exposure to the radiation can be effected through the translucent substrate after both substrates have been attached to each other through the partially cured composition. When both substrates of the assembly are opaque, the partially cured composition is exposed to actinic radiation of the second wavelength prior to attaching the second substrate thereto. In this case, an open time of at least two minutes is desirable to allow for suitable workability of the second curable composition within the partially cured composition.

The second curable composition is typically free or substantially free of other types of polyols other than the polyether polyol. As used herein regarding the presence of other types of polyols, the term "substantially free" means that the curable mixture contains less than 1 weight percent, less than 0.5 weight percent, less than 0.2 weight percent, less than 0.1 weight percent, less than 0.05 weight percent, or less than 0.01 weight percent of the other types of polyols. Other types of polyols include those that are film-forming polymers such as, for example, hydroxyl-containing phenoxy resins, hydroxyl-containing ethylene-vinyl acetate copolymers, polycaprolactone polyols, polyester polyols, and polyvinyl acetal resins. The weight percent values are based on a total weight of the curable composition.

Further, the second curable composition is typically free or substantially free of thermoplastics that have a carboxylic acid group such as, for example, polyesters with a carboxylic acid group (—COOH). As used herein regarding the presence of thermoplastics with carboxyl groups, the term "substantially free" means that the curable mixture contains less than 1 weight percent, less than 0.5 weight percent, less than 0.2 weight percent, less than 0.1 weight percent, less than 0.05 weight percent, or less than 0.01 weight percent of the thermoplastic having a carboxylic acid group. The weight percent values are based on a total weight of the curable composition.

Still further, the second curable composition (and the entire curable mixture) is typically free or substantially free of other "active hydrogen-containing compounds". As used herein, other "active hydrogen-containing compounds" refers to compounds with amino and/or mercapto groups that can react with epoxy resins. As used herein regarding the presence of other active hydrogen containing compounds, the term "substantially free" means that the curable mixture contains less than 0.5 weight percent, less than 0.2 weight percent, less than 0.1 weight percent, less than 0.05 weight percent, or less than 0.01 weight percent of other active hydrogen-containing compounds. The weight percent values are based on a total weight of the curable composition.

The curable mixture typically contains at least 1 weight percent of the polyether polyol based on the total weight of the curable mixture. If there is too little polyether polyol, the second curable composition will cure (polymerize) too rapidly and there may not be sufficient open time after activation of the photo-acid generator and positioning a second substrate adjacent to the activated second curable composition. That is, the structural strength of the bond between the first substrate and the second substrate may be compromised. Further, if there is not enough polyol, the toughness of the cured composition may not be adequate. The amount of the polyether polyol can be up to 25 weight percent based on the total weight of the curable mixture. If the amount of the polyether polyol is too great, the curable mixture may have an insufficient amount of the epoxy resin and/or (meth)acrylate copolymer with pendant (meth)acryloyl groups. Insufficient amounts of the epoxy resin can adversely affect the structural adhesive strength of the cured composition and insufficient amounts of the (meth)acrylate copolymer with pendant (meth)acryloyl groups can adversely affect the pressure-sensitive adhesive characteristics of the partially cured composition.

In many embodiments, the amount of the polyether polyol is at least 1 weight percent, at least 2 weight percent, at least 3 weight percent, at least 4 weight percent, or at least 5 weight percent based on a total weight of the curable mixture. The amount the polyether polyol is often up to 25 weight percent, up to 20 weight percent, up to 18 weight percent, up to 15 weight percent, up to 12 weight percent, or up to 10 weight percent based on a total weight of the curable mixture. In some embodiments, the curable mixture contains 1 to 25 weight percent, 1 to 20 weight percent, 1 to 15 weight percent, 2 to 25 weight percent, 2 to 20 weight percent, 2 to 15 weight percent, 4 to 25 weight percent, 4 to 20 weight percent, 4 to 15 weight percent, 5 to 25 weight percent, 5 to 20 weight percent, 5 to 15 weight percent, 10 to 25 weight percent, 10 to 20 weight percent, or 10 to 15 weight percent.

The weight ratio of the epoxy resin to the polyether polyol is typically in a range of 0.5:1 to 10:1. Stated differently, the amount of epoxy resin can vary from being half of the amount of the polyether polyol to 10 times the amount of the polyether polyol. In some embodiments, the weight ratio is at least 0.6:1, at least 0.8:1, at least 1:1, at least 2:1, or at least 3:1 and can be up to 8:1, up to 6:1, or up to 5:1. In some embodiments, the weight ratio is in a range of 0.6:1 to 10:1, 0.8 to 10:1, 1:1 to 10:1, 1:1 to 8:1, 1:1 to 6:1, 2:1 to 6:1, or 3:1 to 5:1.

Photo-Acid Generator

The photo-acid generator functions to initiate curing of the second curable composition when exposed to a second wavelength of actinic radiation that is different than the first wavelength of actinic radiation used to cure the first curable composition. The photo-acid generator is often referred to as a cationic photoinitiator. The second wavelength of actinic radiation is typically selected to be a shorter wavelength of actinic radiation than that selected for the first wavelength of actinic radiation used to cure the first curable composition. In many embodiments, the second wavelength of actinic radiation is selected to be in the ultraviolet region of the electromagnetic spectrum. That is, the photo-acid generator is selected to be sensitive to (activated by) radiation in the ultraviolet region of the electromagnetic spectrum but not in the visible or near ultraviolet region of the electromagnetic spectrum. For example, the second wavelength of actinic radiation is typically less than 380 nanometers in the ultraviolet region of the electromagnetic spectrum.

Some photo-acid generators are iodonium salts. Example iodonium salts include, but are not limited to, bis(4-tert-butylphenyl) iodonium hexafluoroantimonate (available under the trade designation FP5034 from Hampford Research Inc. (Stratford, Conn., USA)), bis(4-tert-butylphenyl) iodonium camphorsulfonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, (4-methoxyphenyl)phenyl iodonium triflate, bis(4-methylphenyl) iodonium hexafluorophosphate (available under the trade designation OMNICAT 440 from IGM Resins (Bartlett, Ill., USA)), ([4-(octyloxy)phenyl]phenyl iodonium hexafluorophosphate), ([4-(octyloxy)phenyl]phenyl iodonium hexafluoroantimonate), (4-isopropylphenyl)(4-methylphenyl) iodonium tetrakis(pentafluorophenyl) borate (available under the trade designation RHODORSIL 2074 from Bluestar Silicones (East Brunswick, N.J., USA)), and 4-(2-hydroxy-1-tetradecycloxy)phenyl]phenyl iodonium hexafluoroantimonate.

Other photo-acid generators are often a triaryl sulfonium salt. Example triaryl sulfonium salts include, but are not limited to, triphenyl sulfonium hexafluoroantimonate (available under the trade designation CT-548 from Chitec Technology Corp. (Taipei, Taiwan)), diphenyl(4-phenylthio)phenyl sufonium hexafluorophosphate, diphenyl(4-phenylthio) phenyl sufonium hexafluoroantimonate, bis(4-(diphenylsulfonio)phenyl)sulfide bis(hexafluorophosphate), and bis(4-(diphenylsulfonio)phenyl)sulfide hexafluoroantimonate. Blends of triaryl sulfonium salts are available from Synasia (Metuchen, N.J., USA) under the trade designation SYNA PI-6992 for hexafluorophosphate salts and under the trade designation SYNA PI-6976 for hexafluoroantimonate salts. Mixtures of triaryl sulfonium salts are commercially available from Aceto Pharma Corporation (Port Washington, N.Y., USA) under the trade designations UVI-6992 and UVI-6976.

The photo-acid generator is typically used in an amount equal to at least 0.5 weight percent and up to 3 weight percent based on the weight of the curable mixture. In some embodiments, the amount is at least 0.8 weight percent, at least 1.0 weight percent, at least 1.2 weight percent, at least 1.5 weight percent and up to 2.5 weight percent or up to 2.0 weight percent.

The curable mixture is free of both heat activated curatives and thermal acid generators for epoxy resins. Examples of such heat activated curatives include, but are not limited to, dicyandiamide (DICY). Examples of thermal acid generators include, but are not limited to, products available under the trade designations NACURE, TAG, and K-PURE from King Industries (Norwalk, Conn., USA).

Optional Vinyl Ethers

Like epoxy resins, some vinyl ethers can be cured upon activation of a photo-acid generator. These monomers can be used in place of some of the epoxy resins in some embodiments. In most embodiments, however, the curable mixtures are free or substantially free of vinyl ethers. The term "substantially free" regarding the amount of vinyl ethers means that the curable mixture contains less than 1 weight percent, less than 0.5 weight percent, or less than 0.1 weight percent vinyl ether based on a total weight of the curable mixture.

In some embodiments where a vinyl ether is included in the second curable composition, the amount is no greater than 20 weight percent based on a total weight of the epoxy resin and vinyl ether. For example, the amount of vinyl ether is in a range of 1 to 20 weight percent, 1 to 15 weight percent, 1 to 10 weight percent, or 1 to 5 weight percent based on the total weight of epoxy resin and vinyl ether. To avoid inhibiting the cationic polymerization, the vinyl ether monomer may be limited to those not containing nitrogen. Examples of suitable vinyl ethers include, but are not limited to, methyl vinyl ether, ethyl vinyl ether, tert-butyl vinyl ether, isobutyl vinyl ether, triethylene glycol divinyl ether, and 1,4-cyclohexane dimethanol divinyl ether.

Optional Components in the Curable Mixture

Organic Solvents

In some curable mixtures, an organic solvent is included. Suitable organic solvents include, but are not limited to, methanol, tetrahydrofuran, ethanol, isopropanol, pentane, hexane, heptane, acetone, methyl ethyl ketone, methyl acetate, ethyl acetate, toluene, xylene, ethylene glycol alkyl ether, propylene carbonate, and mixtures thereof. The organic solvent can be added to dissolve a reactant in the curable mixture, can be added to lower the viscosity of the curable mixture to facilitate its printing or dispensing, or can be a residue from the preparation of the (meth)acrylate copolymer having pendant (meth)acryloyl groups. The amount of the organic solvent in the curable mixture can be in a range of 0 to 10 weight percent based on a total weight of the curable mixture. In some embodiments, the amount is at least 0.5 weight percent, at least 1 weight percent, at least 2 weight percent, at least 3 weight percent, at least 4 weight percent and up to 10 weight percent, up to 9 weight percent, up to 8 weight percent, up to 7 weight percent, up to 6 weight percent, or up to 5 weight percent.

Silica

Many curable mixtures include optional silica particles. Silica is a thixotropic agent and is added to provide shear thinning. Silica has the effect of lowering the viscosity of the curable mixture when force (shear) is applied. When no force (shear) is applied, however, the viscosity seems higher. That is, the shear viscosity is lower than the resting viscosity.

The silica particles typically have a longest average dimension that is less than 500 nanometers, less than 400 nanometers, less than 300 nanometers, less than 200 nanometers, or less than 100 nanometers. The silica particles often have a longest average dimension that is at least 5 nanometers, at least 10 nanometers, at least 20 nanometers, or at least 50 nanometers. In some embodiments, the silica particles are fumed silica. In other embodiments, the silica particles are non-aggregated nanoparticles.

The amount of the optional silica particles is at least 0.5 weight percent based on a total weight of the curable mixture. The amount of the silica can be at least 1 weight percent, at least 1.5 weight percent, or at least 2 weight percent and can be up to 10 weight percent, up to 8 weight percent, or up to 5 weight percent. For example, the amount of silica can be in a range of 0.5 to 10 weight percent, 1 to 10 weight percent, 0.5 to 8 weight percent, 1 to 8 weight percent, 0.5 to 5 weight percent, or 1 to 5 weight percent.

Silanes

Various silane compounds can be included in the curable mixture. The silane can be added to promote adhesion to the first substrate and/or the second substrate that are bonded together with the cured composition. The silane groups has a silyl group that is particularly effective for increasing the adhesion to substrates having hydroxyl groups such as, for example, glass or ceramic surfaces. The silyl groups are often of formula $-Si(R^5)_x(OR^6)_{3-x}$ where each $R^5$ and each $R^6$ is independently an alkyl. Suitable alkyl groups for $R^5$ and $R^6$ often have 1 to 6 carbon atoms, 1 to 4 carbon atoms, or 1 to 3 carbon atoms. The variable x is 0, 1, or 2. The silyl group has at least one alkoxy group that can undergo hydrolysis and react with a siliceous surface.

The silane can be a hydrophobic or hydrophilic. That is, the silane can be of formula $R^7-Si(R^5)_x(OR^6)_{3-x}$ where $R^7$ can be a hydrophobic or hydrophilic group. Any hydrophobic or hydrophilic group can be used provided it does not interfere with the cationic polymerization of the epoxy resin. That is, $R^7$ usually lacks a nitrogen-containing group. In some embodiments, the silane is a hydrophilic silane and group $R^7$ can react with one of the components of the curable composition such as with a group on the (meth)acrylate copolymer. Such a reaction can result in the covalent attachment of the silane to the cured composition. For example, some silanes are glycidyl ether silanes where $R^7$ contains a glycidyl group. Examples of such silanes include, but are not limited to, (3-glyciyloxypropyl)trimethoxysilane.

The amount of the optional silane is often in a range of 0 to 10 weight percent based on a total weight of the curable mixture. The amount can be at least 0.1 weight percent, at least 0.2 weight percent, at least 0.3 weight percent, at least 0.5 weight percent, or at least 1 weight percent and up to 10 weight percent, up to 8 weight percent, up to 6 weight percent, up to 5 weight percent, up to 4 weight percent, up to 3 weight percent, or up to 2 weight percent. For example, the amount can be in a range of 0.1 to 10 weight percent, 0 to 8 weight percent, 0.1 to 8 weight percent, 0 to 6 weight percent, 0.1 to 6 weight percent, 0 to 4 weight percent, 0.1 to 4 weight percent, 0 to 2 weight percent, or 0.1 to 2 weight percent.

Still Other Optional Components

Still other optional components include, for example, fillers, stabilizers, plasticizers, tackifiers, flow control agents, cure rate retarders, adhesion promoters (for example, titanates), impact modifiers, expandable microspheres, glass beads or bubbles, thermally conductive particles, electrically conductive particles, glass, clay, talc, pigments, colorants, and antioxidants. The optional components can be added, for example, to reduce the weight of the structural adhesive layer, to adjust the viscosity, to provide additional reinforcement, to modify the thermal or conductive properties, to alter the rate of curing, and the like. If any of these optional components are present, they are typically used in an amount that does not prevent the printing or dispensing of the curable mixture.

In many embodiments, the curable mixtures are free or substantially free of fiber reinforcement. As used herein, "substantially free" means that the curable compositions contain no greater than 1 weight percent, no greater than 0.5 weight percent, no greater than 0.2 weight percent, no greater than 0.1 weight percent, no greater than 0.05 weight percent, or no greater than 0.01 weight percent of fibers.

Process of Curing

A method of bonding is provided. The method includes providing a curable mixture containing a first curable composition and a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photoacid generator that is sensitive to actinic radiation of a second wavelength and that is not sensitive to actinic radiation of the first wavelength. The method further includes applying the curable mixture to a first substrate or to a first release liner and exposing the curable mixture to the first wavelength of actinic radiation to form a partially cured composition adjacent to the first substrate or adjacent to the first release liner, wherein the partially cured composition contains (a) a first cured composition that is a reaction product of a first curable composition and (b) the second curable composition. If the curable mixture is applied to a first release liner, the method further includes transferring the partially cured composition from the first release liner to the first substrate. The method still further includes exposing the partially cured composition to the second wavelength of actinic radiation to form an irradiated composition and positioning a second substrate adjacent to the irradiated composition. The cured composition bonds the first substrate to the second substrate.

In some applications, the curable mixture is printed or dispensed on a first substrate that is permanent. After exposure to the first wavelength of actinic radiation, the partially cured composition is adhered to the first substrate. An optional release liner can be positioned on a surface of the partially cured composition opposite the first substrate to provide a first article. This first article can be stored for any desired time. Prior to exposure to the second wavelength of actinic radiation, the optional release liner is removed. The partially cured composition can be exposed to a second wavelength of actinic radiation and then positioned adjacent to a second substrate. After curing, the resulting article contains a cured composition positioned between the first substrate and the second substrate. The cured composition is a semi-structural adhesive or a structural adhesive that bonds the first substrate to the second substrate.

In other applications, the curable mixture is printed or dispensed on a first release liner. After exposure to the first wavelength of actinic radiation, the partially cured composition can be positioned adjacent to an optional second release liner opposite the first release liner. The resulting article can be stored for any desired amount of time. After being stored, the first or second release liner can be removed and the exposed surface of the partially cured composition is adhered to a first substrate. After removing the remaining release liner, the partially cured composition can be exposed to the second wavelength of actinic radiation and then attached to a second substrate. After curing, the resulting article contains a cured composition positioned between the first substrate and the second substrate. The cured composition is a semi-structural adhesive or a structural adhesive that bonds the first substrate to the second substrate.

The curable mixture includes the first curable composition and the second curable composition. The partially cured composition is formed by exposing the curable mixture to a first wavelength of actinic radiation that activates the free radical photoinitiator within the first curable composition but that does not activate the photo-acid generator within the second curable composition. Upon exposure to the first wavelength of actinic radiation, the first curable composition is reacted to form a partially cured composition. The second curable composition is not reacted upon exposure to the first wavelength of actinic radiation.

The partially cured composition contains (a) a first cured composition that is a reaction product of a first curable composition and (b) a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength.

The term "first wavelength of actinic radiation" or similar terms can refer to a single wavelength or to a distribution of wavelengths that activate the free radical initiator. The first wavelength is typically in the visible and/or near ultraviolet regions of the electromagnetic spectrum. Suitable light sources often have a controlled spectral output where the distribution of wavelength is relatively narrow (or "substantially monochromatic") and centered about a characteristic first wavelength $\lambda_1$, such as a wavelength corresponding to a peak intensity. This is not critical, however, and other distributions of wavelengths, including polymodal distributions, may be feasible.

In some embodiments, the first actinic light source produces a spectral output with a peak intensity at a first wavelength $\lambda_1$ being at least 380 nanometers (nm), at least 383 nm, at least 386 nm, at least 390 nm, or at least 393 nm. In this embodiment, the peak intensity can be at a wavelength $\lambda_1$ of up to 420 nm, up to 419 nm, up to 418 nm, up to 417 nm, or up to 416 nm. The excitation dose used to activate the photoinitiator can be at least 200 mJ/cm$^2$, at least 400 mJ/cm$^2$, at least 600 mJ/cm$^2$, at least 800 mJ/cm$^2$, at least 1000 mJ/cm$^2$, at least 1500 mJ/cm$^2$, or at least 2000 mJ/cm$^2$. The excitation dose can be up to 6400 mJ/cm$^2$, up to 6000 mJ/cm$^2$, 5000 mJ/cm$^2$, up to 4000 mJ/cm$^2$, up to 3000 mJ/cm$^2$, up to 2500 mJ/cm$^2$, or up to 2000 mJ/cm$^2$.

One useful class of first actinic light sources are light emitting diodes ("LED"). LED-based ultraviolet (UV) sources are advantageous because they provide UV light over a much narrower wavelength range compared with other UV light sources such as black lights and mercury lamps. Such LED sources are commercially available, for example, the AC Series 365 nm or 395 nm LED Curing Systems available from Excelitas Technologies (Waltham, Mass., USA).

Prior to exposure to the first wavelength of actinic radiation, the curable mixture can be printed or dispensed onto a first substrate (or, alternatively, a first release liner). Upon exposure to the first wavelength of actinic radiation, the first curable composition in the curable mixture undergoes a free radical polymerization reaction resulting in the formation of the partially cured composition. The partially cured composition is rendered dimensionally stable by the polymerization of the pendant (meth)acryloyl groups of the (meth) acrylate copolymer in the first curable composition. Because it is dimensionally stable, the partially cured composition does not significantly change in length, width, or thickness over time under the force of gravity. It is preferable for the dimensions of the partially cured composition to remain stable even when subjected to usual processing, handling, shipment, and storage procedures typically encountered during and after its production.

The partially cured composition may, in some cases, be subjected to sustained levels of stress that can induce creep at ambient temperature. Sources of such stress can include, for example, roll winding tensions or stacking weight. After exposure to the first actinic light source, the partially cured composition can be stored for extended time with a minimal amount of cold flow creep. Further, the partially cured composition can display a significant amount of creep recovery once stress is removed.

The partially cured composition often has a shelf life of at least 5 days, at least 7 days, at least 10 days, at least 30 days, at least 60 days, at least 120 days, at least 180 days, or at least 360 days. As used herein, "shelf life" is defined as the amount of time after curing of the first curable composition that the second curable composition remains essentially uncured while the partially cured composition is maintained under dark conditions at ambient conditions.

Because of the shelf life of the partially cured composition, an article that contains the partially cured composition adhered to the first substrate or on a release liner can be prepared by a manufacturer. A customer can subsequently irradiate the partially cured composition with a second wavelength of light and position the irradiated composition adjacent to a second substrate. That is, the final curing step is done by the customer. If the partially cured composition is on a release liner, the release liner can be removed and the partially cured composition attached to a first substrate prior to exposure to the second wavelength of actinic radiation.

The partially cured composition is usually a pressure-sensitive adhesive. As such, it adheres to the first substrate. The partially cured composition can be readily positioned adjacent to a second substrate such that the second substrate is adhered to the first substrate by the partially cured composition. That is, the partially cured composition, which is a pressure-sensitive adhesive, is positioned between the first substrate and the second substrate and adheres to both substrates.

Typically, the partially cured composition is not positioned adjacent to the second substrate until after the partially cured composition is exposed to the second wavelength of actinic radiation. The term "second wavelength of actinic radiation" or similar terms can refer to a single wavelength or to a distribution of wavelengths that activate the photo-acid generator. The second wavelength is from a second light source that produces a spectral output with a peak intensity at a second wavelength $\lambda_2$ that is different than the first wavelength $\lambda_1$. The photo-acid generator preferentially absorbs radiation emitted by the second actinic light source relative to radiation emitted by the first actinic light source. That is, the photo-acid generator preferentially absorbs little or no radiation emitted by the first actinic light source.

In many embodiments, the second wavelength $\lambda_2$ is shorter than the first wavelength $\lambda_1$. Like the first light source, the second light source often has a controlled spectral output where the distribution of wavelengths is relatively narrow (or "substantially monochromatic") and centered about a characteristic second wavelength $\lambda_2$, such as a wavelength corresponding to a peak intensity. This is not critical, however, and other distributions of wavelengths, including polymodal distributions, may be feasible.

The second wavelength is selected to activate the photo-acid generator in the second curable composition. These compounds generate an acid when activated. In many embodiments, the second wavelength $\lambda_2$ is at least 200 nm, at least 250 nm, at least 300 nm, at least 330 nm, or at least 356 nm. The wavelength $\lambda_2$ can be less than 380 nm, up to 377 nm, or up to 374 nm.

Since the reaction of the second curable composition occurs after curing the first curable composition, the characteristics of second actinic light need not be as restrictive as those of the first actinic light source. The second actinic light source can be based on an LED source, as described earlier. Alternatively, the second actinic light source can be a UV black light, mercury lamp, or another broad-spectrum light source.

A UV black light is a relatively low light intensity source that provides generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., Sterling, Va.) over a wavelength range of 280 nm to 400 nm.

A mercury lamp is a higher intensity broad-spectrum UV source capable of providing intensities generally greater than 10 mW/cm$^2$, and preferably between 15 and 6000 mW/cm$^2$. For example, an intensity of 600 mW/cm$^2$ and an exposure time of about 1 second may be used successfully. Intensities can range from 0.1 mW/cm$^2$ to 6000 mW/cm$^2$ and preferably from 0.5 mW/cm$^2$ to 3000 mW/cm$^2$.

To avoid inadvertently triggering both the first and second curing reactions (i.e., the first curing reaction refers to curing of the first curable composition and the second curing reaction refers to curing of the second curable composition) simultaneously, the first actinic light source is selected so that it emits over wavelengths that are not significantly absorbed by the photo-acid generator within the second curable composition. Where generally monochromatic light sources are used, the first and second actinic light sources can be selected to operate at different wavelengths; for example, they can have respective peak intensities at wavelengths separated by at least 10 nanometers, at least 15 nanometers, at least 20 nanometers, at least 25 nanometers, or at least 35 nanometers. The first and second actinic light sources can have respective peak intensities at wavelengths separated by up to 100 nanometers, up to 80 nanometers, up to 60 nanometers, up to 50 nanometers, or up to 45 nanometers.

When the partially cured composition is exposed to the second wavelength of actinic radiation, the second curable composition is reacted. Exposure to the second wavelength of light results in the reaction of the epoxy resin with the polyether polyol in the second curable composition. The cured composition contains (a) a first cured composition that is a reaction product of a first curable composition and (b) a second cured composition that is a reaction product of a second curable composition. Additionally, exposure to the second wavelength of light often induces covalent bonding between functional groups (e.g., hydroxyl groups and/or carboxylic acid groups) of the (meth)acrylate copolymer and the epoxy resin). In this manner, the first cured composition and the second cured composition can be covalently bonded together even though they were cured sequentially.

The amount of time required to form a functional structural bond following irradiation with the second actinic light source can be at least 1 minute, at least 2 minutes, at least 5 minutes, at least 10 minutes, at least 20 minutes, at least 30 minutes, at least 1 hour, at least 2 hours, at least 4 hours, at least 8 hours, at least 12 hours, at least 18 hours, or at least 24 hours. In some cases, the periods of time specified above may be achieved by heating the adhesive composition.

Until it is fully cured, the partially cured composition usually and preferably has the properties of a pressure-sensitive adhesive. It is preferable that the pressure-sensitive adhesive has sufficient tack and dimensional stability to obviate use of a clamp or other mechanism to secure the first substrate to the second substrate for the entirety of the second curing reaction. Often, a clamp or other mechanism is used in the early stages of curing the second curable composition to ensure that it adequately wets the surface to which it is adhered.

The irradiation of the partially cured composition with the second wavelength of actinic radiation is generally sufficient to form the second cured composition without further intervention. It can be advantageous in some cases, however, to reduce the time required to cure the second curable composition within the partially cured composition by applying heat. Heat can be applied, for example, through a post-irradiation bake, in which the assembly of the first substrate/partially cured composition/second substrate is placed in a heated oven for a pre-determined time.

The post-irradiation bake for an onium salt-type photoacid generator can last for at least 1 minute, at least 2 minutes, at least 3 minutes, or at least 5 minutes. On the upper end, the post-irradiation bake may be sustained up to 35 minutes, up to 25 minutes, or up to 15 minutes. The temperature of the post-irradiation bake can be, for example, at least 35° C., at least 70° C., or at least 90° C. The temperature can be up to 180° C., up to 150° C., or up to 120° C.

Articles Various articles are provided. A first article includes the partially cured composition and at least one substrate and/or release liner. The second article includes a cured composition positioned between two substrates such that a first substrate is bonded to a second substrate.

A first article includes a first substrate or first release liner and the partially cured composition positioned adjacent to the first substrate or to the first release liner. The partially cured composition contains (a) a first cured composition that is a reaction product of a first curable composition and (b) a second curable composition. The first curable composition from which the first cured composition is formed contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength.

Some first articles include a first substrate and the partially cured composition positioned adjacent to the first substrate. Optionally, a release liner can be on a surface of the partially cured composition opposite the first substrate. Other first articles include a first release liner and the partially cured composition positioned adjacent to the partially cured composition. Optionally, a second release liner can be on a surface of the partially cured composition opposite the first release liner.

Where the first substrate is flexible or where the first substrate is absent (e.g., where the article includes a release liner), the first article can be in the form of a roll. In some rolls, there are two release liners on opposite surfaces of the partially cured composition. In other rolls, there is a single release liner.

In some embodiments, the article containing the partially cured composition can be stored adjacent to at least one release liner for any desired amount of time such as, for example, up to 1 week, up to 2 weeks, up to 1 month, up to 2 months, up to 4 months, up to 6 months, up to 8 months, up to 10 months, or up to 1 year.

The partially cured composition in the first article is a pressure-sensitive adhesive. In many embodiments, the first article does not need to be reinforced with fibers as described, for example, in U.S. Patent Application Publication 2002/0182955 (Weglewski et al.).

The partially cured composition often has a creep recovery of at least 20 percent, at least 25 percent, at least 30 percent, at least 35 percent, at least 40 percent, at least 45 percent, or at least 50 percent and up to 98 percent, up to 95 percent, up to 90 percent, up to 85 percent, up to 80 percent, up to 75 percent, or up to 70 percent. For example, the creep recovery can be in a range of 20 to 98 percent, 20 to 90 percent, 20 to 80 percent, 25 to 90 percent, 25 to 80 percent, 30 to 80 percent, or 35 to 80 percent. The creep recovery test is more fully described in the Example section.

The partially cured composition often has a tan(delta), measured at 1 radians/second and at 25° C., that is equal to at least 0.05, at least 0.10, at least 0.20, or at least 0.30 and less than 1, less than 0.95, less than 0.90, less than 0.85, or less than 0.80. For example, the tan(delta) is often in a range of 0.1 to less than 1. The measurement of tan(delta) if further described in the Example section.

The partially cured composition often has a G', measured at 1 radian/second and at 25° C., that is at less than 300 kPa, less than 250 kPa, less than 200 kPa, less than 150 kPa, or less than 100 kPa.

A second article includes a first substrate, a second substrate, and a cured composition positioned between the first substrate and the second substrate. The cured composition contains (a) a first cured composition that is a reaction product of a first curable composition and (b) a second cured composition that is a reaction product of a second curable composition. The first curable composition from which the first cured composition is formed contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength. The cured composition bonds the first substrate to the second substrate.

The cured composition in the second article is typically a structural adhesive or a semi-structural adhesive. The overlap shear strength is usually at least 0.60 MPa, at least 0.65 MPa, at least 0.75 MPa, at least 1.0 MPa, at least 1.2 MPa, at least 1.5 MPa, at least 2.0 MPa, at least 2.5 MPa, at least 3.0 MPa, at least 3.5 MPa, at least 4 MPa, at least 5 MPa, at least 6 MPa, or at least 7 MPa. The method of measuring overalap shear strength is further described in the Examples section.

Any suitable first substrate and second substrate can be used. For example, either substrate can be flexible or inflexible and can be formed from a polymeric material, glass or ceramic material, metal (including various alloys), or combination thereof. In many embodiments, the first and/or second substrates are glass or ceramic material or metals. In other embodiments, the first substrate and/or the second substrate can be a polymeric material such as, for example, a polymeric film, a plastic composite (e.g., glass or fiber filled plastics). The polymeric material can be prepared, for example, from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl(meth)acrylates (PMMA), ethylene-vinyl acetate copolymers, and cellulosic materials (e.g., cellulose acetate, cellulose triacetate, and ethyl cellulose). These substrates are permanent substrates because they cannot be easily removed from the partially cured composition or the cured compositions.

Release liners can be used in the manufacture of the articles and function as temporary substrates. That is, the release liners are replaced with permanent substrates. Suitable release liners typically have low affinity for the partially cured composition. Exemplary release liners can be prepared from paper (e.g., Kraft paper) or other types of polymeric material. Some release liners are coated with an outer layer of a release agent such as a silicone-containing material or a fluorocarbon-containing material (e.g., polyfluoropolyether or polyfluoroethylene).

In some embodiments, the first substrate and the second substrate are different components of a motorized vehicle such as an automobile or truck. For example, one of the substrates can be glass (such as in a windshield) and the second substrate can be hardware attached to the glass. The hardware often has a metallic or polymeric surface.

Various Embodiments

Various embodiments are provided. These include curable mixtures, partially cured compositions, cured compositions, articles containing the partially cured compositions, articles containing the cured compositions, and method of bonding.

Embodiment 1A is a curable mixture. The curable mixture contains (a) a first curable composition and (b) a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength.

Embodiment 2A is the curable mixture of embodiment 1A, wherein the curable mixture is printable and/or dispensable.

Embodiment 3A is the curable mixture of embodiment 1A or 2A, wherein the curable mixture has a shear viscosity no greater than 150 Pascal-seconds at a shear rate of 100 sec$^{-1}$.

Embodiment 4A is the curable mixture of any one of embodiments 1A to 3A, wherein the curable mixture has a shear viscosity no greater than 800 Pascal-seconds at a shear rate of 0.1 sec$^{-1}$.

Embodiment 5A is the curable mixture of any one of embodiments 1A to 4A, wherein the pendant (meth)acryloyl groups are of formula $CH_2=CHR^1-(CO)-Q-L-$ where Q is —O— or —NH—, where $R^1$ is hydrogen or alkyl (e.g., methyl), and where group L includes at least one alkylene, arylene, or combination thereof and can optionally further include —O—, —O(CO)—, —NH(CO)—, —NH—, or a combination thereof.

Embodiment 6A is the curable mixture of any one of embodiments 1A to 5A, wherein the first curable composition is miscible with the second curable composition.

Embodiment 7A is the curable mixture of any one of embodiments 1A to 6A, wherein the (meth)acrylate copolymer having at least two pendant (meth)acryloyl groups is a reaction product of (a) a precursor (meth)acrylate copolymer having pendant functional groups and (b) an unsaturated reagent compound having an (meth)acryloyl group and a complementary group capable of reacting with the pendant functional groups of the precursor (meth)acrylate copolymer.

Embodiment 8A is the curable mixture of embodiment 7A, wherein the precursor (meth)acrylate copolymer is formed from a monomer composition comprising 50 to 99.9 weight percent (hetero)alkyl (meth)acrylate monomers, 0.1 to 30 weight percent second monomers having an ethylenically unsaturated group and a functional group capable of reacting with the unsaturated reagent compound, and 0 to 20 weight percent optional monomers having an ethylenically unsaturated group.

Embodiment 9A is the curable mixture of embodiment 8A, wherein the precursor (meth)acrylate copolymer is formed from a monomer composition comprising 70 to 99.9 weight percent (hetero)alkyl (meth)acrylate monomers and 0.1 to 30 weight percent second monomers having an ethylenically unsaturated group and a functional group capable of reacting with the unsaturated reagent compound.

Embodiment 10A is the curable mixture of embodiment 9A, wherein the precursor (meth)acrylate copolymer is formed from a monomer composition comprising 70 to 99 weight percent (hetero)alkyl (meth)acrylate monomers and 1 to 30 weight percent second monomers having an ethylenically unsaturated group and a functional group capable of reacting with the unsaturated reagent compound.

Embodiment 11A is the curable mixture of any one of embodiments 7A to 10A, wherein the functional group of the second monomer is a hydroxyl group, a carboxylic acid group, or an anhydride group.

Embodiment 12A is the curable mixture of any one of embodiments 1A to 11A, wherein the (meth)acrylate copolymer having at least two pendant (meth)acryloyl group further comprises pendant hydroxyl groups, carboxylic acid groups, or anhydride groups.

Embodiment 13A is the curable mixture of any one of embodiments 1A to 12A, wherein the (meth)acrylate copolymer having at least two pendant (meth)acryloyl groups has up to 55 pendant (meth)acryloyl groups.

Embodiment 14A is the curable mixture of any one of embodiments 1A to 13A, wherein the (meth)acrylate copolymer having at least two pendant (meth)acryloyl groups contains 50 to 99.9 weight percent monomeric units derived from a (hetero)alkyl (meth)acrylate, 0.1 to 30 weight percent monomeric units having a pendant (meth)acryloyl group, 0 to 29.9 weight percent monomeric units derived from a monomer having a pendant hydroxyl group, carboxylic acid group, or anhydride group, and 0 to 20 weight percent monomeric units derived from optional monomers.

Embodiment 15A is the curable mixture of embodiment 14A, wherein the (meth)acrylate copolymer having at least two pendant (meth)acryloyl groups contains 70 to 99 weight percent monomeric units derived from a (hetero)alkyl (meth)acrylate, 1 to 30 weight percent monomeric units having a pendant (meth)acryloyl group, 0 to 29 weight percent monomeric units derived from a monomer having a pendant hydroxyl group, carboxylic acid group, or anhydride group, and 0 to 20 weight percent monomeric units derived from optional monomers.

Embodiment 16A is the curable mixture of embodiment 14A or 15A, wherein the (meth)acrylate copolymer having pendant (meth)acryloyl groups contains 80 to 99 weight percent monomeric units derived from a (hetero)alkyl (meth)acrylate, 1 to 20 weight percent monomeric units having a pendant (meth)acryloyl group, and 0 to 19 weight percent monomeric units derived from a monomer having a pendant hydroxyl group, carboxylic acid group, or anhydride group.

Embodiment 17A is the curable mixture of any one of embodiments 1A to 16A, wherein the (meth)acrylate copolymer having pendant (meth)acryloyl groups has a glass transition temperature calculated using the Fox equation that is no greater than 40° C.

Embodiment 18A is the curable mixture of any one of embodiments 1A to 17A, wherein the curable mixture contains 2 to 25 weight percent of the (meth)acrylate copolymer having pendant (meth)acryloyl groups based on a total weight of the curable mixture.

Embodiment 19A is the curable mixture of any one of embodiments 1A to 18A, wherein the free radical photoinitiator is sensitive to actinic radiation in the first wavelength range of 200 to 800 nanometers or in the first wavelength range of 380 to 800 nanometers.

Embodiment 20A is the curable mixture of any one of embodiments 1A to 19A, wherein the free radical photoinitiator is an acyl phosphine oxide.

Embodiment 21A is the curable mixture of embodiment 20A, wherein the acyl phosphine oxide is of Formula (I) or Formula (II).

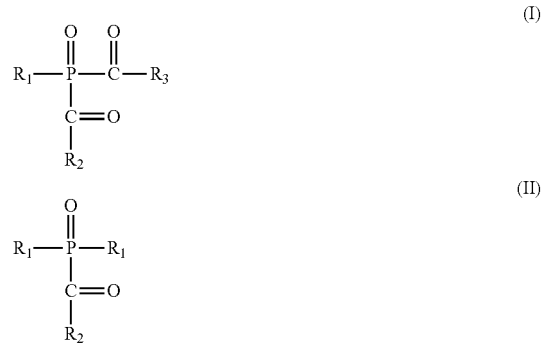

In Formulas (I) and (II), each $R_1$ is independently a linear or branched alkyl having 1 to 18 carbon atoms, a cycloalkyl having 5 to 6 ring members (i.e., cyclopentyl and cyclohexyl), a substituted cycloalkyl, an aryl (e.g., phenyl, biphenyl, and naphthyl), a substituted aryl, or a heterocyclic ring with 5 or 6 ring members and having a sulfur, nitrogen, or oxygen heteroatom. Suitable substituents for substituted aryl and substituted cycloalkyl groups include halo groups (e.g., F, Cl, Br, and I), alkyl groups (e.g., alkyl groups with 1 to 10 carbon atoms, 1 to 6 carbon atoms, or 1 to 4 carbon atom), or alkoxy groups (e.g., alkoxy groups with 1 to 10 carbon atoms, 1 to 6 carbon atoms, or 1 to 4 carbon atoms).

Embodiment 22A is the curable mixture of embodiment 21A, wherein the acyl phosphine oxide is bis(2,4,6-trimethylbenzoyl)phenyl phosphine oxide.

Embodiment 23A is the curable mixture of embodiment 21A, wherein the acyl phosphine oxide is diphenyl(2,4,6-trimethyl)phosphine oxide or ethyl(2,4,6-trimethylbenzoyl) phenyl phosphinate.

Embodiment 24A is the curable mixture of any one of embodiments 1A to 23A, wherein the curable mixture contains 0.01 to 5 weight percent of the free radical photoinitiator based on a total weight of the curable mixture.

Embodiment 25A is the curable mixture of any one of embodiments 1A to 24A, wherein the first curable composition further comprises an optional (hetero)alkyl (meth) acrylate monomer having a boiling point greater than 60° C.

Embodiment 26A is the curable mixture of embodiment 25A, wherein the amount of the optional (hetero)alkyl (meth)acrylate monomer having a boiling point greater than 60° C. is present in an amount in a range of 0 to 50 weight percent based on the weight of the (meth)acrylate copolymer having pendant (meth)acryloyl groups.

Embodiments 27A is the curable mixture of any one of embodiments 1A to 26A, wherein the first curable composition further comprises an optional crosslinking monomer having at least two radically polymerizable groups.

Embodiment 28A is the curable mixture of embodiment 27A, wherein the crosslinking monomer is present in an amount in a range of 0 to 10 weight percent based on a total weight of the curable mixture.

Embodiment 29A is the curable mixture of any one of embodiments 1A to 28A, wherein the epoxy resin comprises a glycidyl ether.

Embodiment 30A is the curable mixture of embodiment 29A, wherein the glycidyl ether comprises a diglycidyl ether.

Embodiment 31A is the curable mixture of any one of embodiments 1A to 30A, wherein the epoxy resin has a weight average molecular weight in a range of 100 to 1000 Daltons.

Embodiment 32A is the curable mixture of any one of embodiments 1A to 31A, wherein the epoxy resin has an equivalent weight in a range of 50 to 500 grams/equivalent.

Embodiment 33A is the curable mixture of any one of embodiments 1A to 32A, wherein the curable mixture comprises 10 to 80 weight percent epoxy resin based on a total weight of the curable mixture.

Embodiment 34A is the curable mixture of any one of embodiments 1A to 33A, wherein the curable mixture has a weight ratio of the (meth)acrylate copolymer having at least two pendant (meth)acryloyl groups to the epoxy resin is in a range of 1:20 to 1:0.5.

Embodiment 35A is the curable mixture of any one of embodiments 1A to 34A, wherein the polyether polyol has at least two or at least 3 hydroxyl groups.

Embodiment 36A is the curable mixture of any one of embodiments 1A to 35A, wherein the polyether polyol has a hydroxyl number equal to at least 10.

Embodiment 37A is the curable mixture of any one of embodiments 1A to 36A, wherein the polyether polyol is a liquid at temperatures above 40° C.

Embodiment 38A is the curable mixture of any one of embodiments 1A to 37A, wherein the polyether polyol has a weight average molecular weight no greater than 50,000 Daltons.

Embodiment 39A is the curable mixture of any one of embodiments 1A to 38A, wherein both the epoxy resin and the polyether polyol are soluble in the curable mixture.

Embodiment 40A is the curable mixture of any one of embodiments 1A to 39A, wherein the curable mixture comprises 1 to 25 weight percent polyether polyol based on a total weight of the curable mixture.

Embodiment 41A is the curable mixture of any one of embodiments 1A to 40A, wherein the curable mixture has a weight ratio of epoxy resin to polyether polyol in a range of 0.5:1 to 10:1.

Embodiment 42A is the curable mixture of any one of embodiments 1A to 41A, wherein the photo-acid generator is sensitive to second wavelength of actinic radiation that is shorter than the first wavelength of actinic radiation.

Embodiment 43A is the curable mixture of embodiment 42A, wherein the second wavelength of actinic radiation is in the ultraviolet region of the electromagnetic spectrum.

Embodiment 44A is the curable mixture of embodiment 42A or 43A, wherein the photo-acid generator is sensitive to a second wavelength of actinic radiation in the ultraviolet region of the electromagnetic spectrum but not to a first wavelength of actinic radiation in the near ultraviolet or visible region of the electromagnetic spectrum.

Embodiments 45A is the curable mixture of any one of embodiments 1A to 44A, wherein the photo-acid generator is an iodonium salt or a triaryl sulfonium salt.

Embodiment 46A is the curable mixture of any one of embodiments 1A to 45A, wherein the curable mixture contains 0.5 to 2.5 weight percent photo-acid generator based on a total weight of the curable mixture.

Embodiment 47A is the curable mixture of any one of embodiments 1A to 46A, wherein the curable mixture further comprises optional silica particles.

Embodiment 48A is the curable mixture of embodiment 47A, wherein the silica particles have an average longest dimension that is less than 500 nanometers.

Embodiment 49A is the curable mixture of embodiment 47A or 48A, wherein the curable mixture contains 0 to 10 weight percent silica based on a total weight of the curable mixture.

Embodiment 50A is the curable mixture of any one of embodiments 1A to 49A, wherein the curable mixture further comprises an optional silane.

Embodiment 51A is the curable mixture of embodiment 50A, wherein the optional silane is a hydrophobic silane or a hydrophilic silane.

Embodiment 52A is the curable mixture of embodiment 50A or 51A, wherein the optional silane is a hydrophilic silane having a group that can react with a complementary group on the (meth)acryloyl copolymer having pendant (meth)acryloyl groups.

Embodiment 53A is the curable mixture of embodiment 52A, wherein the silane has a glycidyl group that can react with a pendant hydroxyl group or pendant carboxylic acid group of the (meth)acrylate copolymer having pendant (meth)acryloyl groups.

Embodiment 54A is the curable mixture of any one of embodiments 50A to 53A, wherein the curable mixture contains 0 to 10 weight percent optional silane based on a total weight of the curable mixture.

Embodiment 55A is the curable mixture of any one of embodiments 1A to 54A, wherein the curable mixture is free or substantially free of fiber reinforcement.

Embodiment 1B is a partially cured composition. The partially cured composition contains (a) a first cured composition that is a reaction product of a first curable composition and (b) a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2)

a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength.

Embodiment 2B is the partially cured composition of embodiment 1B, wherein the first curable composition and/or the second curable composition is according to any one of embodiments 2A to 55A.

Embodiment 3B is the partially cured composition of embodiment 1B or 2B, wherein the partially cured composition is a pressure-sensitive adhesive.

Embodiment 4B is the partially cured composition of any one of embodiments 1B to 3B, wherein the partially cured composition has a creep recovery in a range of 20 to 98 percent using the test procedure described in the Example section.

Embodiment 5B is the partially cured composition of any one of embodiments 1B to 4B, wherein the partially cured composition has a tan(delta) measured at 1 radians/second and 25° C. that is less than 1.

Embodiment 6B is the partially cured composition of any one of embodiments 1B to 5B, wherein the partially cured composition has a G' measured at 1 radians/second and 25° C. that is less than 300 kPa.

Embodiment 1C is a cured composition. The cured composition contains (a) a first cured composition that is a reaction product of a first curable composition and (b) a second cured composition that is a reaction product of a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength.

Embodiment 2C is the cured composition of embodiment 1C, wherein the first curable composition and/or the second curable composition is according to any one of embodiments 2A to 55A.

Embodiment 3C is the cured composition of embodiment 1C or 2C, wherein the cured composition is a semi-structural adhesive or a structural adhesive.

Embodiment 1D is a first article. The first article includes a first substrate or a first release liner and a partially cured composition positioned adjacent to the first substrate or to the first release liner. The partially cured composition contains (a) a first cured composition that is a reaction product of a first curable composition and (b) a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength.

Embodiment 2D is the first article of embodiment 1D, wherein the partially cured composition is according to any one of embodiments 2B to 6B.

Embodiment 3D is the first article of embodiment 1D or 2D, wherein the first article comprises a first substrate, the partially cured composition, and an optional second release liner. The optional second release liner is adjacent to a surface of the partially cured composition opposite the first substrate.

Embodiment 4D is the first article of embodiments 1D or 2D, wherein the first article comprises a first release liner, the partially cured composition, and an optional second release liner. The optional second release liner is adjacent to a surface of the partially cured composition opposite the first release liner.

Embodiment 1E is a second article. The second article includes a first substrate, a second substrate, and a cured composition positioned between the first substrate and the second substrate.

The first substrate is bonded to the second substrate with the cured composition. The cured composition contains (a) a first cured composition that is a reaction product of a first curable composition and (b) a second cured composition that is a reaction product of a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength.

Embodiment 2E is the second article of embodiment 1E, wherein the cured composition is according to embodiment 2C or 3C.

Embodiment 3E is the second article of embodiment 1E or 2E, wherein the first substrate and the second substrates are different components of a motorized vehicle.

Embodiment 1F is a method of bonding. The method includes providing a curable mixture containing a first curable composition and a second curable composition. The first curable composition contains (1) a (meth)acrylate copolymer having at least two pendant (meth)acryloyl groups, the (meth)acrylate copolymer having a weight average molecular weight in a range of 35,000 to 300,000 Daltons and (2) a free radical photoinitiator that is sensitive to actinic radiation of a first wavelength. The second curable composition contains (1) an epoxy resin, (2) a polyether polyol, and (3) a photo-acid generator that is sensitive to actinic radiation of a second wavelength and that is not sensitive to actinic radiation of the first wavelength. The method further includes applying the curable mixture to a first substrate or to a first release liner and exposing the curable mixture to the first wavelength of actinic radiation to form a partially cured composition adjacent to the first substrate or adjacent to the first release liner, wherein the partially cured composition contains (a) a first cured composition that is a reaction product of a first curable composition and (b) the curable second mixture. If the curable mixture is applied to the first release liner, the method further includes transferring the partially cured composition from the first release liner to the first substrate. The method still further includes exposing the partially cured composition to the second wavelength of actinic radiation to form an irradiated composition and positioning a second substrate adjacent to the irradiated composition. The method yet further includes forming a cured composition that bonds the first substrate to the second substrate.

Embodiment 2F is the method of embodiment 1F, wherein the first curable composition and/or the second curable composition is according to any one of embodiments 2A to 55A.

Embodiment 3F is the method of embodiment 1F or 2F, wherein the curable mixture is applied by printing or dispensing.

Embodiment 4F is the method of any one of embodiments 1F to 3F, wherein the partially cured composition is according to any one of embodiment 2B to 6B.

Embodiment 5F is the method of any one of embodiments 1F to 4F, wherein the cured composition is according to embodiments 2C or 3C.

Embodiment 6F is the method of any one of embodiments 1F to 5F, wherein the first wavelength of actinic radiation and/or the second wavelength of actinic radiation is supplied by an LED actinic radiation source.

Embodiment 7F is the method of any one of embodiments 1F to 6F, wherein the (meth)acrylate copolymer having at least two pendant (meth)acryloyl groups is prepared using an adiabatic polymerization process.

EXAMPLES

Materials

The materials with their sources were as listed in Table 1. Unless otherwise indicated, all materials were purchased from commercial sources and used as received.

TABLE 1

Materials List

| Acronym | Description | Supplier |
|---|---|---|
| Monomers and Additives | | |
| AL240 | Polyether polyol obtained under the trade designation ARCOL LHT 240 | Covestro (Pittsburgh, PA, USA) |
| nBA | n-butyl acrylate, monomer | BASF Corporation (Florham Park, NJ, USA) |
| 2-EHA | 2-ethylhexyl acrylate, monomer | Sigma-Aldrich (St Louis, MO, USA) |
| E1001F | Diglycidyl ether of bisphenol-A epoxy resin obtained under the trade designation EPON 1001F | Hexion (Columbus, OH, USA) |
| E1510 | Epoxy resin containing a diglycidyl ether of hydrogenated bisphenol A obtained under the trade designation EPONEX 1510 | Hexion (Columbus, OH, USA) |
| GPTMS | 3-(glycidoxypropyl) trimethoxy silane | United Chemical Technologies (Bristol, PA, USA) |
| HDDA | Hexanediol diacrylate, monomer | Allnex USA Inc. (Alpharetta, GA, USA) |
| HPA | Hydroxypropyl acrylate, monomer | Tokyo Chemical Industry Co., LTD (TCI) (Tokyo, Japan) |
| IBOA | Isobornyl acrylate, monomer | Millipore Sigma, formerly Sigma-Aldrich (St Louis, MO, USA) |
| LVPREN | Ethylene-vinyl acetate copolymer, obtained under the trade designation LEVAPREN 700HV | Lanxess Corporation (Pittsburgh, PA, USA) |
| PETA | Pentaerytritol triacrylate | Millipore Sigma, formerly Sigma-Aldrich (St. Louis, MO, USA) or Sartomer Americas (Exton, PA, USA) |

TABLE 1-continued

Materials List

| Acronym | Description | Supplier |
|---|---|---|
| PKHA | Phenoxy resin, obtained under the trade designation PHENOXY PKHA | Gabriel Performance Products (Akron, OH, USA) |
| THFA | Tetrahydrofurfuryl acrylate, monomer | San Esters (New York, NY, USA) |
| SIL | Hydrophobic fumed silica with a typical surface area of 120 m$^2$/gram obtained under the trade designation CAB-O-SIL TS-720 | Cabot Corporation (Boston, MA, USA) |
| Initiators, Inhibitors, and Antioxidants | | |
| 1-651 | 2,2-dimethoxy-2-phenylacetophenone, a free radical photoinitiator | BASF Corporation (Florham Park, NJ, USA) |
| IOTG | Isooctyl thioglycolate, a chain transfer agent | Evans Chemetics (Teaneck, NJ, USA) |
| TPO-L | Ethyl-2,4,6-trimethyl benzoyl phenylphosphinate, a liquid free radical photoinitiator | BASF Corporation (Florham Park, NJ, USA) |
| V52 | 2,2'-azo-bis(2,4-dimethyl pentanenitrole), a thermally activated polymerization initiator obtained under the trade designation VAZO 52 | Chemours (Wilmington, DE, USA) |
| V88 | 1,1'-azo-bis(cyclohexanecarbonitrile), a thermally activated polymerization initiator obtained under the trade designation VAZO 88 | Chemours (Wilmington, DE, USA) |
| L101 | 2,5-bis(tert-butylperoxy)-2,5-dimethylhexane, a thermally activated polymerization initiator obtained under the trade designation LUPEROX 101 | Arkema Incorporated (Philadelphia, PA, USA) |
| L130 | 2,5-dimethyl-2,5-di-(tert-butylperoxy)-3-hexyne, a thermally activated polymerization initiator obtained under the trade designation LI30 | Arkema Incorporated (Philadelphia, PA, USA) |
| MEHQ | Hydroquinone monomethyl ether, a polymerization inhibitor | Millipore Sigma, formerly Sigma-Aldrich (St. Louis, MO, USA) |
| IR1010 | Pentaerythritoltetrakis(3-(3,5-ditertbutyl-4-hydroxyphenyl)propionate), an antioxidant obtained under the trade designation IRGANOX 1010 | BASF Corporation (Florham Park, NJ, USA) |
| U6976 | Triarylsulfonium hexafluoroantimonate, 50 wt % in propylene carbonate, a photo-acid generator obtained under the trade designation UVI-6976 | Synasia Inc. (Metuchen, NJ, USA) |
| Solvents | | |
| EtOAc | Ethyl acetate | BDH Chemicals (Radnor, PA, USA) |

EXPERIMENTAL METHODS

Mixing and Coating Procedure

Mixtures of epoxy/polyols, initiators, and acrylates were prepared by adding all components to an appropriately sized speedmix cup and speed mixed using a FlackTek Speed-Mixer (Landrum, S.C., USA) until mixture appeared well blended (not cloudy). In some cases, it was necessary to heat the components in the speedmix cup using an oven (70° C., 10 minutes).

In all cases, each formulation was liquid, with varying degrees of viscosity (see Table 8). These liquids were knife-coated (25-30 mil (0.64-0.76 mm)) between two sheets of silicone-treated polyethylene terephthalate (PET) and immediately exposed to a 395 nm LED array (Excelitas Technologies, Waltham, Mass., USA) to give a partially cured material. This sufficiently reduced the cold flow of the samples, allowing them to be cut for subsequent testing and exposure to 365 nm LED array (Excelitas Technologies, Waltham, Mass., USA) (see Table 9 for mechanical testing data).

Light Exposure Conditions

Light exposure was measured by a UV Power Puck II radiometer (Electronic Instrumentation & Technology, Inc., Leesburg, Va., USA). The range of exposure doses given to each sample are summarized in Table 2.

TABLE 2

Range of dose to each sample.

|  | Minimum | | Maximum | |
| --- | --- | --- | --- | --- |
|  | mJ/cm² | mW/cm² | mJ/cm² | mW/cm² |
| 365 nm LED (UV-A) | 5600 | 1200 | 7410 | 1610 |
| 395 nm LED (UV-V) | 2400 | 1700 | 2850 | 1960 |

Test Methods
Solids Content

Polymer solids content was determined gravimetrically by weighing samples into an aluminum pan and drying at 160° C. under a vacuum for at least 45 minutes. Two samples were measured and the average value reported. Percent solids were calculated using the following equation.

Wt % Solids=100[(X−Y)/(Z−Y)]

The variable X is the weight of the dry sample plus aluminum pan. The variable Y is the weight of the aluminum pan. The variable Z is the weight of the wet sample (before drying) plus the weight of the aluminum pan.

Molecular Weight Distribution

Polymers were evaluated for their molecular weights using gel permeation chromatography (GPC). The polymer was dissolved in tetrahydrofuran at a concentration of 0.5 percent (weight/volume) and passed through a 0.2 micrometer polytetrafluoroethylene filter. Samples of the resulting solution were analyzed using a Waters Corporation (Milford, Mass., USA) GPC unit equipped with two PLgel 5 micrometer MIXED-D columns (Styragel HR5E 7.8 mm×300 mm) at 35° C. (obtained from Waters Corp. Milford, Mass., USA) and UV (Model 2487) and Refractive Index (Model 2410) detectors. After injection, samples were eluted at 1 milliliter/minute. Calibration was carried out using polystyrene standards. The weight average molecular weight (Mw) was determined and reported in kilodaltons (KDa).

Rheometric Methods

Shear viscosity and creep-recovery performance of uncured (liquid) and partially cured compositions were determined using a Discovery HR-2 parallel plate rheometer (TA Instruments, New Castle, Del.).

Liquid samples were loaded between 25 mm diameter parallel plates affixed to a stress-controlled rotational rheometer. The temperature was controlled at 25° C. using the attached oven and nitrogen gas. The sample gap was lowered to 1.05 mm, the sample edge was trimmed, and then the sample gap was lowered to 1 mm.

Partially cured samples were cut using an 8-mm die punch and loaded between 8-mm diameter parallel plates affixed to a stress-controlled rotational rheometer. Temperature was controlled at 25° C. using the attached oven and nitrogen gas. A normal force ($F_N$) of 0.5 N was applied.

Flow Sweep Test:

A flow sweep was performed to obtain shear viscosity of the uncured samples. The shear rate was increased from 0.1 to 100 sec$^{-1}$ logarithmically with three points per decade of data collected. The steady state shear viscosity at 0.1 sec$^{-1}$ and 100 sec$^{-1}$ were recorded.

Frequency Sweep Test:

A frequency sweep was performed to obtain tan(delta) and G' of the partially cured samples. The sample was oscillated from 0.1 to 100 rad/s (radians per second) at a strain amplitude of 3 percent for uncured (liquid) samples and 1 percent for partially cured samples. The tan(delta) and G' were recorded at 1 rad/s.

Creep-Recovery Test:

A constant stress of 1000 pascals (Pa) was applied for 60 seconds, then a constant stress of 0 Pa was applied for 60 seconds. The strain at 59.2 seconds ($\gamma_{60s}$) was recorded to characterize the creep, or cold-flow of the composition and is expressed as a percent strain. The strain at 119.2 seconds ($\gamma_{120s}$) and total experiment time were recorded to characterize the creep-recovery behavior of the composition and is given by the following relationship:

Creep recovery(%)=[1−($\gamma_{60s}$/$\gamma_{120s}$)]×100

Creep-recovery provides an indication in the elasticity of a composition. Large creep-recovery, (e.g. 100%) indicates high elasticity; small creep-recovery (e.g., <10%) indicates viscous flow.

In the experiments involving uncured (liquid) samples, negative creep-recovery values were obtained and determined to be an artifact due to the low viscosity nature of the materials. Negative values were reported as 0%.

Overlap Shear Testing

A selected partially cured adhesive material was cut into an area of 0.5 inch×1 inch (12.7 mm×25.4 mm). Aluminum substrates sized at 1 inch×4 inches×0.064 inch (25.4 mm×101.6 mm×1.63 mm) were prepared by scrubbing the terminal 1 inch (25.4 mm) with Scotch-Brite General Purpose Hand Pad #7447 (3M, Maplewood, Minn.) followed by washing with isopropanol and air-drying. The adhesive composition was applied to the scrubbed end of one substrate. The release liner was removed and the composition was exposed to 365 nm UV LED light source. A second substrate was applied to the irradiated sample, thus closing the bond (bond area 0.5 inch×1 inch (12.7 mm×25.4 mm)). The assembly was wet out by means of applying a static 10-pound roller 3 times horizontally and vertically. The bond was clamped with large binder clips and allowed to sit at room temperature for 18-24 hours prior to testing.

A dynamic overlap shear test was performed at ambient temperature using an MTS Sintech Tensile Tester (Eden Prairie, Minn.). Test specimens were loaded into the grips and the crosshead was operated at 0.1 inch (2.54 mm) per minute, loading the specimen to failure. Stress at break was recorded in units of megaPascals (MPa).

Calculations
Calculated Glass Transition Temperature ($T_g$)

The Fox equation was used to determine the glass transition temperature ($T_g$) in degrees Kelvin (K) for the (meth) acrylate copolymer. The data if the tables below is in ° C. The calculation is based on the weighted average of the individual homopolymer glass transition values. For a copolymer prepared from n different monomers, the inverse of the $T_g$ of the copolymer is equal to the summation of the weight fraction (w) of each component monomer divided by the $T_g$ of the corresponding homopolymer of that particular component monomer.

$$1/T_g = \Sigma w_i/T_{g,i}$$

In this equation, $T_g$ refers to the glass transition temperature of the copolymer, which can refer to the precursor (meth) acrylate copolymer or for the (meth)acrylate copolymer having at least two pendant (meth)acryloyl groups. $T_{g,i}$ is the glass transition temperature of each component i, and $w_i$ if the mass fraction of each component i.

Calculated of Average Molecular Weight Between (Meth) Acryloyl Groups

The theoretical average number of pendant (meth)acryloyl groups can be calculated by either of the following formulas.

meth(acryloyl) per chain=(moles of unsaturated reagent compound)×($Mw$ of precursor (meth) acrylate copolymer)÷(mass of precursor (meth) acrylate copolymer)

meth(acryloyl) per chain=($Mw$ of precursor (meth) acrylate copolymer)×(mole fraction of hydroxyl-containing monomers that are reacted with the unsaturated reagent compound)× (weight percent of hydroxyl-containing monomer)÷(molecular weight of hydroxyl-containing monomer)

EXAMPLES

Example 1A (EX-1A) (50/47/3 BA/THFA/HPA) Treated with IEM

A solution was prepared by stirring 50 grams THFA, 44.52 grams BA, 3.0 grams HPA, 0.10 grams IR1010 antioxidant, 1.50 grams of 25 weight percent IOTG (chain transfer agent) dissolved in BA, and 0.82 grams of 2.5 weight percent MEHQ dissolved in BA within an 8 ounce glass jar and heating to 65° C. The solution was cooled to 50° C. A mixture of 0.48 grams of 0.25 weight percent solids V52 dissolved in BA was added and mixed. Then, 80 grams of the mixture was transferred to the stainless-steel reactor. The reactor was purged of oxygen while heating and pressurized with 60 psi of nitrogen gas before reaching the induction temperature of 63° C. The polymerization reaction proceeded under adiabatic conditions to a peak reaction temperature of 131° C. A 5.0-gram aliquot was taken from the reaction mixture and the unreacted monomer was 62.7 weight percent based on the total weight of the mixture.

A solution was prepared by mixing 1.0 gram V52 initiator, 0.10 grams V88 initiator, 0.05 grams L101 peroxide, 0.15 grams L130 peroxide, and 48.70 grams of ethyl acetate in a 4 ounce glass jar. The mixture was shaken on a reciprocating mixer to dissolve the solids. Then, 0.7 grams of the solution and 0.35 grams of 25 weight percent IOTG was stirred into the stainless-steel reactor. The reactor was purged of oxygen while heating and then pressurized with 60 psi of nitrogen gas before reaching the induction temperature of 59° C. The polymerization reaction proceeded under adiabatic conditions to a peak reaction temperature of 190° C. The mixture was isothermally held at that temperature for 30 minutes and then drained into an 8 ounce jar. A sample was taken and the unreacted monomer was 4.7 weight percent based on the total weight of the mixture.

The (meth)acrylate copolymer was treated with IEM by the following procedure. 62.7 grams of copolymer was placed in an 8 ounce jar, to which 2.24 grams of IEM was added. The bottle was sealed and taped shut, and placed on a roller for greater than 16 hours. After the first two to four hours, a heat lamp was employed to heat the contents of the bottle to about 60° C. for the remainder of the time. The properties for this example are summarized in Table 6, below.

Example 1B (EX-1B) (50/47/3 BA/THFA/HPA) Treated with IEM

Example 1B was prepared in a manner similar to Example 1A except with the modifications shown in Tables 3-5. The properties for this example are summarized in Table 6, below.

Comparative Example 1A (CE-1A) (50/47/3 BA/THFA/HPA) Treated with IEM

Comparative Example 1A was prepared in a manner similar to Example 1A except with the modifications shown in Tables 3-5. The properties for this example are summarized in Table 6, below.

Comparative Example 1B (CE-1B) (50/50 BA/THFA) not Treated with IEM

Comparative Example 1B was prepared in a manner similar to Example 1A except with the modifications shown in Tables 3-4. No IEM functionalization was performed. The properties for this example are summarized in Table 6, below.

Comparative Example 1C (CE-1C) (50/47/3 BA/THFA/HPA) not Treated with IEM

Comparative Example 1C was prepared in a manner similar to Example 1A except with the modifications shown in Tables 3-4. No IEM functionalization was performed. The properties for this example are summarized in Table 6, below.

Example 1C (EX-1C) (20/40/40 HPA/IBOA/2-EHA) Treated with IEM 775.4 grams of 2-EHA, 800.0 grams of IBOA, 400.0 grams of HPA, 4.0 grams of IOTG, 1.7 grams of a mixture of 0.4 grams of V52 dissolved in 20.0 grams of 2-EHA, and 23.3 grams of a mixture of 0.7 grams of MEHQ dissolved in 40.0 grams of 2-EHA all were added to a stainless-steel reaction vessel. The mixture was purged of oxygen with nitrogen and pressurized to 30 psig with nitrogen and warmed to induction temperature of 60° C. and then allowed to polymerize adiabatically, reaching the Peak 1 temperature shown in Table 4. The mixture was cooled to 50° C. and a sample (10.93 grams) was collected after flushing the drain line clear with 19.20 grams of the reaction mixture. To the reaction vessel was added 19.70 grams of a mixture of 1.0 grams of V52, 2.0 grams V67, 2.5 grams V88 all fully dissolved in 44.50 grams 2-EHA. 3.93 grams of IOTG was added to the reaction vessel (one-third of the amount of IOTG provided in the IOTG column of Table 3.) The mixture was purged of oxygen with nitrogen, pressurized to 30 psig with nitrogen, warmed to induction temperature of 60° C. and allowed to polymerize adiabatically, reaching the Peak 2 temperature shown in Table 4. A sample (42.66 grams) of the reaction mixture was collected after flushing the drain line clear with 27.11 grams of the reaction product.

The mixture was cooled to 110° C. and 50 pph of IBOA, 951.2 gram, was fully mixed into the reaction mixture based on 100 parts of polymerized oligomer in the reaction vessel. 0.8 pph of IEM (22.83 grams) was mixed into the reaction vessel and held under a nitrogen/oxygen 90/10 atmosphere for 2 hours at 110° C. The product was then drained.

Example 1D (EX-1D) (20/40/40 HPA/IBOA/2-EHA) Treated with IEM 776 grams of 2-EHA, 800.0 grams of IBOA, 400.0 grams of HPA, 4.0 grams of IOTG, 1.2 grams of a mixture of 0.4 grams of V52 dissolved in 20.0 grams of 2-EHA, and 23.3 grams of a mixture of 0.7 grams of MEHQ dissolved in 40.0 grams of 2-EHA all were added to a stainless-steel reaction vessel. The mixture was purged of oxygen with nitrogen and pressured to 30 psig with nitrogen and warmed to induction temperature of 60° C. and then allowed to polymerize adiabatically, reaching the Peak 1 temperature shown in Table 4. The mixture was cooled to 50° C. and a sample (15.28 grams) was collected after flushing the drain line clear with 7.28 grams of the reaction mixture. To the reaction vessel was added 19.77 grams of a mixture of 1.0 gram of V52, 2 grams V67, 2.5 grams V88 all fully dissolved in 44.50 grams 2-EHA. 3.95 grams of IOTG was added to the reaction vessel (one-third of the amount of IOTG provided in the IOTG column of Table 3.) The mixture was purged of oxygen with nitrogen, pressured to 30 psig with nitrogen, warmed to induction temperature of 60° C. and allowed to polymerize adiabatically, reaching the Peak 2 temperature shown in Table 4. A sample (13.91 grams) of the reaction mixture was collected after flushing the drain line clear with 6.73 grams of the reaction product.

The mixture was cooled to 110° C. and 50 pph of IBOA, 978.9 grams, was fully mixed into the reaction mixture based on 100 parts of polymerized oligomer in the reaction vessel. 1.2 pph of IEM (35.24 grams) was mixed into the reaction vessel and held under a nitrogen/oxygen 90/10 atmosphere for 2 hours at 110° C. The product was then drained.

Example 1E (EX-1E) (20/40/40 HPA/IBOA/2-EHA) Treated with IEM 776 grams of 2-EHA, 800.0 grams of IBOA, 400.0 grams of HPA, 4.0 grams of IOTG, 1.2 grams of a mixture of 0.4 grams of V52 dissolved in 20.0 grams of 2-EHA, and 23.3 grams of a mixture of 0.7 grams of MEHQ dissolved in 40.0 grams of 2-EHA all were added to a stainless-steel reaction vessel. The mixture was purged of oxygen with nitrogen and pressured to 30 psig with nitrogen and warmed to induction temperature of 60° C. and then allowed to polymerize adiabatically, reaching the Peak 1 temperature shown in Table 4. The mixture was cooled to 50° C. and a sample (11.20 grams) was collected after flushing the drain line clear with 9.61 grams of the reaction mixture. To the reaction vessel was added 19.79 grams of a fully dissolved mixture of 1.0 gram of V52, 2 grams V67, 2.5 grams V88 all dissolved in 44.50 grams 2-EHA. 3.96 grams of IOTG was added to the reaction vessel (one-third of the amount of IOTG provided in the IOTG column of Table 3.) The mixture was purged of oxygen with nitrogen, pressured to 30 psig with nitrogen, warmed to induction temperature of 60° C. and allowed to polymerize adiabatically, reaching the Peak 2 temperature shown in Table 4. A sample (18.84 grams) of the reaction mixture was collected after flushing the drain line clear with 15.50 grams of the reaction product.

The mixture was cooled to 110° C. and 50 pph of IBOA (973.1 grams), was fully mixed into the reaction mixture based on 100 parts of polymerized oligomer in the reaction vessel. 1.6 pph of IEM (31.14 grams) was mixed into the reaction vessel and held under a nitrogen/oxygen 90/10 atmosphere for 2 hours at 110° C. The product was then drained.

The amounts of monomer in Table 3 are given as weight percent (wt %) based on the total weight of monomers in the polymerizable composition used to form the precursor (meth)acrylate copolymer. The amount of IOTG in Table 3 is given in parts per hundred (pph) based on the weight of the monomers used to form the precursor (meth)acrylate copolymer.

The properties for these examples are summarized in Table 6, below.

TABLE 3

Formulations used to prepare the precursor (meth)acrylate copolymer

| Example | BA (wt %) | THFA (wt %) | HPA (wt %) | IBOA (wt %) | 2-EHA (wt %) | IOTG (pph) |
|---|---|---|---|---|---|---|
| EX-1A | 50 | 47 | 3 | | | 0.3 |
| EX-1B | 50 | 47 | 3 | | | 0.2 |
| CE-1A | 50 | 47 | 3 | | | 0.75 |
| CE-1B | 50 | 50 | | | | 1.75 |
| CE-1C | 50 | 47 | 3 | | | 1.75 |
| EX-1C | | | 20 | 40 | 40 | 0.6 |
| EX-1D | | | 20 | 40 | 40 | 0.6 |
| EX-1E | | | 20 | 40 | 40 | 0.6 |

TABLE 4

Polymerization Conditions

| Example | Temperature Peak 1 (° C.) | Temperature Peak 2 (° C.) | % Polymer Step 1 | % Polymer Step 2 |
|---|---|---|---|---|
| EX-1A | 131 | 190 | 37.3 | 95.3 |
| EX-1B | 142 | 192 | 38.4 | 95.7 |
| CE-1A | 132 | 177 | 40.9 | 94.8 |
| CE-1B | 132 | 183 | 38.7 | 96.3 |
| CE-1C | 126 | 176 | 37.3 | 94.6 |
| EX-1C | 133.0 | 168.0 | 44.1 | 95.4 |
| EX-1D | 130.4 | 163.3 | 40.1 | 93.4 |
| EX-1E | 134.1 | 154.1 | 38.2 | Not determined |

TABLE 5

Treatment with IEM

| Example | IEM Addition Method | IEM (pph) | diluent IBOA (pph) |
|---|---|---|---|
| EX-1A | EtOAc solution | 3.6 | 0 |
| EX-1B | EtOAc solution | 3.6 | 0 |
| CE-1A | in situ | 3.6 | 0 |
| EX-1C | IBOA solution | 0.8 | 50 |
| EX-1D | IBOA solution | 1.2 | 50 |
| EX-1E | IBOA solution | 1.6 | 50 |

TABLE 6

Properties for Examples 1A to 1E and Comparative Examples 1A to 1C

| Example | Mw (kDa) | Polydispersity Index | Fox $T_g$ (° C) | Calculated # (Meth)acryloyl groups per chain | % Solids |
|---|---|---|---|---|---|
| EX-1A | 104 | 5.6 | −35.1 | 23.9 | 100 |
| EX-1B | 233 | 8.8 | −35.1 | 53.6 | 100 |
| CE-1A | 33 | 3.5 | −35.1 | 7.5 | 100 |
| CE-1B | 14 | 2.7 | −35.3 | NA | 100 |
| CE-1C | 14 | 2.5 | −35.1 | NA | 100 |
| EX-1C | 40 | Not determined | 2.1 | 2.1 | 33 |
| EX-1D | 40 | Not determined | 2.1 | 3.1 | 33 |
| EX-1E | 40 | Not determined | 2.1 | 4.1 | 33 |

Comparative Examples 2 to 4 (CE-2 to CE-4) and
Examples 2 to 14 (EX-2 to EX-14)

The formulations for Comparative Examples 2 to 4 (CE-2 to CE-4) and Examples 2 to 14 (EX-2 to EX-14) are summarized in Table 7. Formulations were prepared per the 'Mixing and Coating Procedure' described above. Rheological and mechanical testing data for CE-2 to CE-4 and EX-2 to EX-14 is summarized in Tables 8 and 9, respectively.

TABLE 7

Formulations of epoxy/(meth)acrylate components.

| Example | (meth)acrylic copolymer | (meth)acrylic copolymer Wt-% | PETA Wt-% | U 6976 Wt-% | TPO-L Wt-% | SIL Wt-% | Silane (GPTMS) Wt-% | E1510 Wt-% | AL240 Wt-% |
|---|---|---|---|---|---|---|---|---|---|
| CE-2 | CE-1A | 46.6% | 4.7% | 1.9% | 0.2% | 1.9% | 0.79% | 35% | 8% |
| CE-3 | CE-1B | 46.6% | 4.7% | 1.9% | 0.2% | 1.9% | 0.79% | 35% | 8% |
| CE-4 | CE-1C | 46.6% | 4.7% | 1.9% | 0.2% | 1.9% | 0.79% | 35% | 8% |
| EX-2 | EX-1A | 46.6% | 4.7% | 1.9% | 0.2% | 1.9% | 0.79% | 35% | 8% |
| EX-3 | EX-1B | 46.6% | 4.7% | 1.9% | 0.2% | 1.9% | 0.79% | 35% | 8% |
| EX-4 | EX-1B | 22.4% | 4.7% | 1.9% | 0.2% | 2.9% | 1.21% | 54% | 13% |
| EX-5 | EX-1C | 46.6% | 4.7% | 1.9% | 0.2% | 1.9% | 0.79% | 35% | 8% |
| EX-6 | EX-1E | 46.6% | 4.7% | 1.9% | 0.2% | 1.9% | 0.79% | 35% | 8% |
| EX-7 | EX-1C | 70.9% | 4.7% | 1.9% | 0.2% | 0.9% | 0.38% | 17% | 4% |
| EX-8 | EX-1C | 22.4% | 4.7% | 1.9% | 0.2% | 2.9% | 1.21% | 54% | 13% |
| EX-9 | EX-1C | 9.3% | 4.7% | 1.9% | 0.2% | 3.4% | 1.43% | 64% | 15% |
| EX-10 | EX-1D | 45.1% | 4.7% | 2% | 0.2% | 2% | 1% | 36% | 8% |
| EX-11 | EX-1D | 45.6% | 4.7% | 2% | 0.2% | 2% | 0% | 37% | 9% |
| EX-12 | EX-1D | 46.1% | 4.7% | 2% | 0.2% | 0% | 1% | 37% | 9% |
| EX-13 | EX-1D | 47.4% | 0% | 2% | 0.2% | 2% | 1% | 36% | 9% |
| EX-14 | EX-1D | 44.1% | 4.7% | 4% | 0.2% | 2% | 1% | 35% | 9% |

Comparative Example 5 (CE-5)

A (meth)acrylate copolymer was prepared by the method of U.S. Pat. No. 5,804,610 (Hamer et al.). Solutions were prepared by combining 50 parts by weight (pbw) nBA, 50 pbw THFA, 0.2 pbw I-651, and 0.1 pbw IOTG in an amber glass jar and swirling by hand to mix. The solution was divided into 25 grams aliquots within heat sealed compartments of an ethylene vinyl acetate-based film, immersed in a 16° C. water bath, and polymerized using UV light (UVA=4.7 mW/cm$^2$, 8 minutes per side).

32 pbw acrylate copolymer, 19 pbw E1001F, 9 pbw LVPREN, 9 pbw PKHA, 19 pbw E1510, 9 pbw AL240, 0.9 pbw GPTMS, 0.5 pbw U6976, 0.02 pbw TPO-L, and 2.4 pbw PETA were compounded using a 30 mm Werner & Pfleiderer co-rotating twin screw extruder. Components were premixed, then volumetrically fed into the extruder feed throat and subjected to 300 rotations per minute (rpm) mixing. The extruder, melt transport and die temperatures were set to 110° C. After compounding, the material was coated at a thickness of 0.020 inch (0.5 mm) between silicone release liners. Care was taken to minimize ambient light exposure of the finished sample. Rheological data for CE-5 is summarized in Table 8.

TABLE 8

Rheology data

| Example | Initial (uncured) % Recovery | Shear Viscosity (Pa-s), 0.1 sec$^{-1}$ | Shear Viscosity (Pa-s), 100 sec$^{-1}$ | Partially cured % Creep-Recovery | tan(delta) 1 rad/sec | G' (KPa) 1 rad/sec |
|---|---|---|---|---|---|---|
| CE-2 | 0% | 108 | 22 | 97% | 0.08 | 33.3 |
| CE-3 | DNT[1] | | | DNT | | |
| CE-4 | DNT[1] | | | DNT | | |

TABLE 8-continued

Rheology data

| | Initial (uncured) | | | Partially cured | | |
|---|---|---|---|---|---|---|
| Example | % Recovery | Shear Viscosity (Pa-s), 0.1 sec$^{-1}$ | Shear Viscosity (Pa-s), 100 sec$^{-1}$ | % Creep-Recovery | tan(delta) 1 rad/sec | G' (KPa) 1 rad/sec |
| EX-2 | 0% | 272 | 29 | 98% | 0.06 | 33.8 |
| EX-3 | 0% | 526 | 105 | 98% | 0.08 | 32.7 |
| EX-4 | 0% | 306 | 26 | 98% | 0.05 | 20.8 |
| EX-5 | 0% | 84 | 18 | 49% | 0.45 | 116.2 |
| EX-6 | 0% | 80 | 18 | 23% | 0.89 | 131.3 |
| EX-7 | 0% | 65 | 15 | 58% | 0.83 | 284.9 |
| EX-8 | 0% | 108 | 6 | 39% | 0.35 | 34.7 |
| EX-9 | 0% | 161 | 4 | 73% | 0.19 | 16.5 |
| EX-10 | 0% | 71 | 16 | 57% | 0.47 | 102.3 |
| EX-11 | 0% | 93 | 18 | 54% | 0.84 | 42.5 |
| EX-12 | 0% | 11 | 11 | 58% | 0.62 | 54.2 |
| EX-13 | 0% | 75 | 17 | 63% | 0.22 | 18.0 |
| EX-14 | 0% | 76 | 15 | 51% | 0.72 | 367.1 |
| CE-5 | 52% | 176782 | NA$^2$ | 58% | 0.84 | 20.6 |

$^1$DNT stands for Did Not Test; cohesive split occurred when removing release liner.
$^2$Not applicable; unable to obtain valid shear viscosity at a shear rate of 100 s$^{-1}$.

TABLE 9

Mechanical Testing Data of Fully Cured Compositions

| Example | OLS (MPa) |
|---|---|
| CE-2 | 0.007 |
| EX-2 | 0.614 |
| EX-3 | 5.39 |
| EX-4 | 5.39 |
| EX-5 | 3.87 |
| EX-6 | 3.93 |
| EX-7 | 1.68 |
| EX-8 | 7.64 |
| EX-9 | 8.67 |
| EX-10 | 5.65 |
| EX-11 | 5.92 |
| EX-12 | 4.92 |
| EX-13 | 4.68 |
| EX-14 | 2.05 |

What is claimed is:

1. A curable mixture comprising:
   (a) a first curable composition comprising
      (1) a (meth)acrylate copolymer having at least two pendant (meth)acryloyl groups, the (meth)acrylate copolymer having a weight average molecular weight in a range of 35,000 to 300,000 Daltons;
      (2) a crosslinking monomer having at least two (meth)acryloyl groups, wherein the crosslinking monomer is present in an amount range from 1 to 10 weight percent based on a total weight of the curable mixture; and
      (3) a free radical photoinitiator that is sensitive to actinic radiation of a first wavelength that is at least 380 nanometers; and
   (b) a second curable composition that is miscible with the first curable composition and that is combined with the first curable composition only after formation of the (meth)acrylate copolymer having at least two pendant (meth)acryloyl groups, the second curable composition comprising
      (1) an epoxy resin;
      (2) a polyether polyol; and
      (3) a photo-acid generator that is sensitive to actinic radiation of a second wavelength that is less than 380 nanometers and that is not sensitive to actinic radiation of the first wavelength;
   wherein the first curable composition but not the second curable composition is curable at the first wavelength and wherein the second curable composition is cured after the first curable composition, and
   wherein the curable mixture is free or have less than 0.5 weight percent of active hydrogen-containing compounds having an amino or mercapto group that can react with epoxy resin; and
   wherein the curable mixture is printable.

2. The curable mixture of claim 1, wherein the curable mixture has a shear viscosity no greater than 150 Pascal-seconds at a shear rate of 100 sec$^{-1}$ when measured using a parallel plate viscometer.

3. The curable mixture of claim 1 comprising:
   5 to 75 weight percent of the (meth)acrylate copolymer having at least two pendant (meth)acryloyl groups;
   1 to 10 weight percent of the crosslinking monomer having at least two (meth)acryloyl groups;
   0.01 to 5 weight percent of the free radical photoinitiator;
   10 to 80 weight percent of the epoxy resin;
   2 to 25 weight percent of the polyether polyol;
   0.5 to 3 weight percent of the photo-acid generator; and
   0 to less than 0.5 weight percent of active hydrogen-containing compounds having an amino or mercapto group that can react with epoxy resin.

4. A partially cured composition of a curable mixture that is printable, the partially cured composition comprising:
   (a) a first cured composition that is a reaction product of a first curable composition comprising
      (1) a (meth)acrylate copolymer having at least two pendant (meth)acryloyl groups, the (meth)acrylate copolymer having a weight average molecular weight in a range of 35,000 to 300,000 Daltons;
      (2) a crosslinking monomer having at least two (meth)acryloyl groups, wherein the crosslinking monomer is present in an amount range from 1 to 10 weight percent based on a total weight of the curable mixture; and (3) a free radical photoinitiator that is sensitive to actinic radiation of a first wavelength that is at least 380 nanometers; and (b) a second curable composition that is miscible with the first curable composition and that is combined with the first curable composition only after formation of the (meth)acrylate copolymer having at least two pendant (meth)acryloyl groups, the second curable composition comprising
  (1) an epoxy resin;
  (2) a polyether polyol; and
  (3) a photo-acid generator that is sensitive to actinic radiation of a second wavelength that is less than 380 nanometers and that is not sensitive to actinic radiation of the first wavelength,
wherein the curable mixture is free or have less than 0.5 weight percent of active hydrogen-containing compounds having an amino or mercapto group that can react with epoxy resin.

5. The partially cured composition of claim 4, wherein the partially cured composition is a pressure-sensitive adhesive.

6. A first article comprising:
a first substrate or a first release liner; and
a partially cured composition of a curable mixture that is printable, the partially cured composition positioned adjacent to the first substrate or adjacent to the first release liner, the partially cured composition comprising
(a) a first cured composition that is a reaction product of a first curable composition comprising
  (1) a (meth)acrylate copolymer having at least two pendant (meth)acryloyl groups, the (meth)acrylate copolymer having a weight average molecular weight in a range of 35,000 to 300,000 Daltons;
  (2) a crosslinking monomer having at least two (meth)acryloyl groups, wherein the crosslinking monomer is present in an amount range from 1 to 10 weight percent based on a total weight of the curable mixture; and
  (3) a free radical photoinitiator that is sensitive to actinic radiation of a first wavelength that is at least 380 nanometers; and
(b) a second curable composition that is miscible with the first curable composition and that is combined with the first curable composition only after formation of the (meth)acrylate copolymer having at least two pendant (meth)acryloyl groups, the second curable composition comprising
  (1) an epoxy resin;
  (2) a polyether polyol; and
  (3) a photo-acid generator that is sensitive to actinic radiation of a second wavelength that is less than 380 nanometers and that is not sensitive to actinic radiation of the first wavelength,
wherein the curable mixture is free or have less than 0.5 weight percent of an active hydrogen-containing compounds having an amino or mercapto group that can react with epoxy resin.

7. The first article of claim 6, wherein the partially cured composition is positioned between the first substrate and a second release liner.

8. The first article of claim 6, wherein the partially cured composition is positioned between the first release liner and a second release liner.

9. The first article of claim 6, wherein the partially cured composition is a pressure-sensitive adhesive.

10. A method of bonding, the method comprising:
providing a curable mixture that is printable, the curable mixture comprising
(a) a first curable composition comprising
  (1) a (meth)acrylate copolymer having at least two pendant (meth)acryloyl groups, the (meth)acrylate copolymer having a weight average molecular weight in a range of 35,000 to 300,000 Daltons;
  (2) a crosslinking monomer having at least two (meth)acryloyl groups, wherein the crosslinking monomer is present in an amount range from 1 to 10 weight percent based on a total weight of the curable mixture; and
  (3) a free radical photoinitiator that is sensitive to actinic radiation of a first wavelength that is at least 380 nanometers; and
(b) a second curable composition that is miscible with the first curable composition and that is combined with the first curable composition only after formation of the (meth)acrylate copolymer having at least two pendant (meth)acryloyl groups, the second curable composition comprising
  (1) an epoxy resin;
  (2) a polyether polyol; and
  (3) a photo-acid generator that is sensitive to actinic radiation of a second wavelength that is less than 380 nanometers and that is not sensitive to actinic radiation of the first wavelength,
wherein the curable mixture is free or have less than 0.5 weight percent of active hydrogen-containing compounds having an amino or mercapto group that can react with epoxy resin;
applying the curable mixture to a first substrate or to a first release liner and exposing the curable mixture to the first wavelength of actinic radiation to form a partially cured composition adjacent to the first substrate or adjacent to the first release liner, wherein if the curable mixture is applied to the first release liner, the method further comprises transferring the partially cured composition from the first release liner to the first substrate;
exposing the partially cured composition to the second wavelength of actinic radiation to form an irradiated composition;
positioning a second substrate adjacent to the irradiated composition; and
forming a cured composition that bonds the first substrate to the second substrate.

11. The method of claim 10, wherein applying the curable mixture comprising printing or dispensing the curable mixture.

* * * * *

UNITED STATES PATENT AND TRADEMARK OFFICE
CERTIFICATE OF CORRECTION

PATENT NO. : 11,655,403 B2
APPLICATION NO. : 16/621276
DATED : May 23, 2023
INVENTOR(S) : Kelly Anne Volp It is certified that error appears in the above-identified patent and that said Letters Patent is hereby corrected as shown below:

In the Claims

Column 55
Line 57, In Claim 6, delete "an" before "active hydrogen-containing compounds".

Signed and Sealed this
Seventh Day of November, 2023

Katherine Kelly Vidal
*Director of the United States Patent and Trademark Office*